United States Patent
Yao et al.

(10) Patent No.: US 6,181,676 B1
(45) Date of Patent: Jan. 30, 2001

(54) SYSTEM PROTECTION SWITCHING

(75) Inventors: Liqian Yao, Kanata; Martin d'Anjou, Gatineau, both of (CA)

(73) Assignee: Nortel Networks Limited, Montreal (CA)

( * ) Notice: Under 35 U.S.C. 154(b), the term of this patent shall be extended for 0 days.

(21) Appl. No.: 09/016,309

(22) Filed: Jan. 30, 1998

(51) Int. Cl.$^7$ .......................... G01R 31/08; G06F 11/00; G08C 15/00; H04J 1/16

(52) U.S. Cl. .......................... 370/226; 370/217; 370/228; 370/243

(58) Field of Search ...................................... 370/216, 228, 370/243, 349, 395, 226, 227, 221, 217; 359/127, 128, 161, 110, 177

(56) References Cited

U.S. PATENT DOCUMENTS

| | | | |
|---|---|---|---|
| 5,311,501 | * 5/1994 | Takatsu | 370/16 |
| 5,532,862 | * 7/1996 | Tada et al. | 359/161 |
| 5,574,717 | * 11/1996 | Tomizawa et al. | 370/13 |
| 5,862,175 | * 1/1999 | Sugiyama et al. | 375/219 |
| 5,978,354 | * 11/1999 | Taketomi et al. | 370/226 |
| 6,035,080 | * 3/2000 | Henry et al. | 385/24 |

* cited by examiner

*Primary Examiner*—Huy D. Vu
*Assistant Examiner*—M. Phan

(57) ABSTRACT

A radio communication network comprising a plurality of communication terminals and a plurality of repeaters intermediate the communication terminals, with wayside communication paths being established between pairs of the repeaters via two radio channels carrying the same data. Protection switching of a wayside path is determined, in a preferred embodiment, by using one common wayside path to calculate the FEC (Forward Error Correction) and PEC (Parity Error Count). Switching to the better of said two channels is effected if FEC or PEC exceed predetermined thresholds. The common wayside path is defined as follows:

(a) Σ wayside A path+Σ wayside B path
  −Σ (wayside A ∥wayside B), if waysides A and B are overlapped (∥indicates overlapped portions of the two parameters.)

(b) wayside A path OR wayside B path, if waysides A and B are not overlapped.

In another embodiment, each wayside tributary's path FEC and PEC is calculated by adding up the main traffic sections FEC and PEC on the wayside path. In yet another embodiment, main traffic section FEC and PEC are used to trigger wayside protection switching. The actual protection switching is performed by hardware in less time than the duration of a wayside data bit.

25 Claims, 18 Drawing Sheets

| SEVERITY LEVEL | M-RECORD (BIT) | L-RECORD (BIT) | DESCRIPTION |
| --- | --- | --- | --- |
| 10 | SOA PRESENT STATUS | SOA PRESENT STATUS | 1 = SOA MISSING<br>0 = SOA PRESENT |
| 20 | CC I/F STATUS | CC I/F STATUS | 1 = AT LEAST 1 CC I/F ALARM TRUE<br>0 = NO ACTIVE CC I/F ALARM |
| 20 | WPSF | WPSF | 1 = SIGNAL FAILURE TRUE ON THE RADIO CHANNEL (WAYSIDE PATH)<br>0 = NO SIGNAL FAILURE ON WAYSIDE PATH |
| 30 | WAYSIDE A AND B ALARMS STATUS | WAYSIDE A AND B ALARMS STATUS | 1 = AT LEAST BOTH WAYSIDE STREAMS HAVE 1 ACTIVE ALARM<br>0 = AT LEAST 1 WAYSIDE STREAM IS NORMAL |
| 40 | WAYSIDE A OR B ALARMS STATUS | WAYSIDE A OR B ALARMS STATUS | 1 = AT LEAST 1 WAYSIDE ALARM TRUE FOR 1 WAYSIDE STREAM<br>0 = NO ACTIVE ALARM ON BOTH WAYSIDE STREAMS |
| 50 | WPSD | WPSD | 1 = SIGNAL DEGRADATION TRUE ON THE RADIO CHANNEL (WAYSIDE PATH)<br>0 = NO SIGNAL DEGRADATION ON WAYSIDE PATH |

FIG. 11

| ENABLE BIT | MATE_OUTPUT _STATUS BIT | OWN CHANNEL | TWO MATE CHANNELS | DESCRIPTION |
| --- | --- | --- | --- | --- |
| 1 | - | - | OFF | IF ENABLE BIT IS SET TO 1, TWO MATE WAYSIDE OUTPUT DRIVERS SHOULD BE TURNED OFF |
| 1 | 0 | ON | OFF | IF ENABLE BIT IS SET TO 1 AND MATE_OUTPUT_STATUS BIT IS SET TO 0 (MATE SWITCHES OFF), THE OWN OUTPUT SWITCH SHOULD BE TURNED ON |
| 0 | - | OFF | - | IF ENABLE BIT IS SET TO 0, TWO MATE WAYSIDE OUTPUT DRIVERS SHOULD BE TURNED OFF |

FIG. 12

| WAYSIDE STREAMS A & B OUTPUT DRIVERS STATUS | MATE_OUTPUT_STATUS |
|---|---|
| BOTH OFF | 0 |
| OTHERS | 1 |

SYSTEM PROTECTION SWITCHING

BACKGROUND OF THE INVENTION

This invention relates to wayside protection switching for a SONET/SDH radio communication network comprising a plurality of radio communication terminals and a plurality of repeaters intermediate the communication terminals.

SONET and SDH are standards for a multiplexing format for a Synchronous Optical Network. SDH is a Synchronous Digital Hierarchy.

In a SONET/SDH radio system, besides the main traffic, additional traffic can also be transmitted and carried in the main traffic overhead bytes, such as wayside (DS-1 capacity), Service channel (DS-0 capacity) etc. See ITU-RF 751-1, section 4.1.2., 1992–94. In the present invention, protection switching of wayside traffic is used as described hereinafter.

The additional traffic could consist of more than one tributary depending on the main traffic overhead capacity. To simplify the description, protection switching of two wayside tributaries is discussed and illustrated herein as examples.

The main traffic's protection switching mode is 1:n, where n is an integer greater than 1, e.g. 1 for 11. The wayside protection switching mode of this invention is 1+1.

In the present invention, when a wayside signal enters an ADD site, it is bridged to two radio channels, resulting in two adjacent channels carrying the same wayside data. This redundant configuration makes protection switching possible by selecting the better of the two radio channels when dropping the wayside traffic to a customer. The wayside radio path is protected by using unused bandwidth from an adjacent radio channel to transport a copy of the wayside data. This constitutes a redundant radio path for the wayside data. The SOA (Service Overhead Access) circuit pack is protected by having a redundant SOA circuit pack from which the wayside can be selected at a site where the wayside is dropped.

A radio communication network is subject to radio channel impairment from a variety of causes such as electrical interference, faulty equipment or radio fading. In such cases, it is necessary to have affected communication channels switched to a radio protection channel. In the case of a pair of main radio traffic terminals, switching to the protection channel (1 for n channels) is performed by a radio signal processor at the receive terminal site if a threshold value is exceeded for either line FEC (Forward Error Correction) or line PEC (Parity Error Count). FEC is a count of the number of corrected errors. The line FEC and line PEC are calculated based on the entire traffic, namely payload and overhead, and are an accumulation of section FEC and PEC from the start terminal to the end terminal.

SUMMARY OF THE INVENTION

The present invention is concerned with non-hitless protection switching (to a different path) in the case of wayside radio traffic which involves communications between repeaters forming part of a channel between two main traffic terminals. Because wayside paths could be shorter than the main traffic path, it is inappropriate to make a switching decision for wayside traffic based on line FEC and line PEC or accumulation of section FEC and section PEC from the start terminal. Rather, according to the present invention, there are three ways to separate the wayside switching decision-making from that of the main traffic:

a. use different radio overhead (ROH) bits to calculate each wayside tributary's path FEC and PEC by adding up the main traffic's section FEC and PEC on the wayside path. For each tributary, eight bits are used for FEC and four bits for PEC. If there are n wayside tributaries, then the total necessary bits for this calculation will be:

$$N(\text{total bits}) = n*(8+4) = 12n$$

In accordance with method "a":

1) At any ADD site, the FEC and PEC count bits corresponding to the tributary to be added are set to zero.
2) At any THRU site, the section FEC and PEC are accumulated to the existing counts.
3) At any DROP site, the accumulated FEC and PEC corresponding to the tributary to be dropped are compared with thresholds to determine a protection switching.

b. use radio overhead bits to calculate a common wayside path FEC and PEC. Eight bits are used for FEC and four bits for PEC plus other necessary bits. If there are n wayside tributaries, there needs to be one bit to indicate a start, two bits to represent FEC and PEC quality and n bits for tributary IDs. The total necessary radio overhead bits for this calculation will be:

$$N(\text{total bits}) = (8+4) = 12, \text{ when } n=1; = (8+4)+1+2+n = 15+n, \text{ when } n>1.$$

A site where one wayside is dropped and the other passed through is referred to as a DROP & THRU herein, while a site where one wayside is dropped and the other not in use is called a DROP.

In accordance with method "b", the currently preferred embodiment of the invention, a switching decision is made by using one common wayside path to calculate FEC (Forward Error Correction) and PEC (Parity Error Count), switching being effected if FEC or PEC exceed predetermined thresholds, the common wayside path, taking two paths as an example, being defined as follows:

(a) Σ wayside A path+Σ wayside B path
−Σ (wayside A ||wayside B), if waysides A and B are overlapped (|| indicates overlapped portions of the two parameters.)

(b) wayside A path OR wayside B path, if waysides A and B are not overlapped.

Fundamentally, wayside path operation is merely setting values to the above introduced ROH bytes to initiate correct wayside protection switching. The important point here is that with one common wayside path operation, it is necessary to perform switching of two waysides as independently as possible, i.e. if two waysides are not dropped at the same site, the one affected by failures should be switched individually. A simple solution to this concern is to use Poor FEC, Poor PEC and Stream Indicator bits to record whether a wayside stream and only this stream has a failure, while utilizing FEC and PEC count bits to record the path quality after the failure (if there is one) till the drop site. By doing so, the two waysides can be easily switched separately when needed. Details of a wayside path operation are given below:

ADD Site

If both waysides are added together, set the Start Indicator bit to start a wayside path and all other bits in both bytes to 0.

If waysides are added separately, set the Start Indicator bit and all other bits to 0 at the first add site. (If one wayside is added with the other one passed thru, the site will be considered as the second add site; otherwise, it will be the first add site on a wayside path.) At the second add site, check if the accumulated FEC and accumulated PEC are above the threshold. If not, no action is needed. If yes, there will be three actions:

1. set Poor FEC and/or Poor PEC bit(s) depending on which one exceeds the threshold;
2. set Stream Indicator bit corresponding to the wayside which has poor FEC and/or PEC;
3. set all FEC and/or PEC count bits to 0.

The reason for these three actions is to cope with a scenario in which a radio channel failure occurs before the second wayside stream is added. The above three actions ensure that a protection switching is performed at the drop site for the first added wayside (the Stream Indicator bit identifies the "bad" stream). It also ensures no switching for the second added wayside if the accumulated FEC and accumulated PEC (recorded by the FEC and PEC bits) are below the threshold (since all FEC and PEC bits are reset to 0 at the start of its individual path).

DROP Site

At a drop site, a protection switching is based on the following conditions:

Poor FEC and/or poor PEC bits(s) set to 1 AND the dropped wayside Stream Indicator(s) set to 1.

If both wayside streams are dropped together, the Start Indicator bit should be cleared.

If they are dropped separately, the Start Indicator bit should be cleared at a DROP site. At a DROP & THRU site, the protection switching is considered in accordance with Poor FEC and/or Poor PEC bit(s), and these two bits must be cleared at this site. (The site where one wayside is dropped and the other passed thru is referred to as DROP & THRU here; while the site where one wayside is dropped and the other not in use is called DROP.) This protects the following drop sites from unnecessary switching, especially when the wayside path is a "chain-style". The Start Indicator should not be cleared at this moment.

Other Sites

For non-add and non-drop sites, if the Start Indicator bit is set, the section FEC and PEC should be accumulated. If not, no action is required.

c. use main traffic section FEC and PEC to trigger wayside protection switching. In this case, there needs to be 2 bits for each tributary to indicate the FEC and PEC quality. If there are n wayside tributaries, then the total necessary bits for this calculation will be:

$$N(\text{total bits}) = 2 * n = 2n.$$

In accordance with method "c", main traffic section FEC (Forward Error Correction) and PEC (Parity Error Count) are used to trigger wayside protection switching, two bits of radio overhead being used for each wayside tributary to indicate FEC and PEC quality. At each THRU site and DROP site, set these two bits for each wayside tributary according to the following table:

TABLE

| For one wayside stream | | Description |
|---|---|---|
| bit 2 | bit 1 | |
| 0 | 0 | The section FEC and PEC below the switching threshold and the wayside path is normal. |
| 0 | 1 | The section FEC/PEC above the SF threshold. |
| 1 | 0 | The section FEC/PEC above the SD threshold but below the SF threshold and the protection switching threshold is set to SF. |
| 1 | 1 | The section FEC/PEC above the SD threshold but below the SF threshold and the protection switching threshold is set to SD. | where SF is signal failure and SD is signal degradation.

According to a broad aspect of the invention there is provided an a SONET/SDH radio communication network comprising a plurality of main radio communication terminals and a plurality of repeaters intermediate the communication terminals, with wayside communication paths being established between pairs of said repeaters via two radio channels carrying the same data, a method for determining whether to effect protection switching of a wayside path to the better of said two channels, comprising using different radio overhead bits to record, for each of a plurality n of wayside tributary paths, FEC (Forward Error Correction) and PEC (Parity Error Count) using 12 bits for each tributary path (8 for FEC and 4 for PEC), subject to the following conditions:

(1) at an ADD site, set to zero the entire 12 bits corresponding to the added tributary,
(2) at a DROP or THRU site, accumulate the section FEC and PEC by adding the main traffic's section FEC and PEC to the FEC bits and the PEC bits corresponding to the wayside stream to be passed through or dropped,
(3) at any DROP site, compare the FEC and PEC corresponding to the tributary to be dropped with predetermined thresholds to determine whether protection switching is required.

According to another broad aspect of the invention there is provided in a SONET/SDH radio communication network comprising a plurality of main radio communication terminals and a plurality of repeaters intermediate the communication terminals, with wayside communication paths being established between pairs of said repeaters via two radio channels carrying the same data, a method for determining whether to effect protection switching of a wayside path to the better of said two channels, comprising making a switching decision by using one common wayside path to calculate FEC (Forward Error Correction) and PEC (Parity Error Count), switching being effected if FEC or PEC exceed predetermined thresholds, said common wayside path being defined as follows:

(a) Σ wayside A path+Σ wayside B path
    −Σ (wayside A ∥wayside B), if waysides A and B are overlapped (∥indicates overlapped portions of the two parameters.)
(b) wayside A path OR wayside B path, if waysides A and B are not overlapped.

According to another broad aspect of the invention there is provided in a SONET/SDH radio communication network comprising a plurality of main radio communication terminals and a plurality of repeaters intermediate the communication terminals, with wayside communication paths being established between pairs of said repeaters via two radio channels carrying the same data, a method for determining whether to effect protection switching of a wayside path to the better of said two channels, comprising using main traffic section FEC (Forward Error Correction) and PEC (Parity Error Count) to trigger wayside protection switching, two bits of a wayside path signal flag byte being used for each wayside tributary to indicate FEC and PEC quality, 2 n bits being used in the case of n wayside tributaries, both bits for an added wayside stream being set to 0 at an ADD site and said bits being set at a THRU or DROP site as shown in the following table:

TABLE

| For one wayside stream | | |
|---|---|---|
| bit 2 | bit 1 | Description |
| 0 | 0 | The section FEC and PEC below the switching threshold and the wayside path is normal. |
| 0 | 1 | The section FEC/PEC above the SF threshold. |
| 1 | 0 | The section FEC/PEC above the SD threshold but below the SF threshold and the protection switching threshold is set to SF. |
| 1 | 1 | The section FEC/PEC above the SD threshold but below the SF threshold and the protection switching threshold is set to SD. |

According to another broad aspect of the invention there is provided in a SONET/SDH radio communication network comprising a plurality of main radio communication terminals and a plurality of repeaters intermediate the communication terminals, with wayside communication paths being established between pairs of said repeaters via two radio channels carrying the same data, a system for protection switching of said wayside paths, comprising, for each repeater, duplicated software and hardware on first and second service overhead access(SOA) units, said software determining if protection switching is required and signalling said hardware to effect protection switching, said switching being effected in a "break before make" manner as follows:

(1) the software enables ENABLE bits on a first SOA, which results in the hardware sending a signal to disable both ENABLE bits on the second SOA,
(2) the output drivers of the second SOA are turned off based on the ENABLE bits control after which their status is fed back to the first SOA,
(3) the output drivers of the first SOA are switched on based on its own ENABLE.

BRIEF DESCRIPTION OF THE DRAWINGS

FIG. 9 illustrates one situation, thought to be rare, which may not be correctly handled by the present invention, FIG. 11 is a table of two condition records maintained by the wayside protection switching system to compare wayside conditions on the two channels in order to make a switching decision, FIG. 12 is a table explaining how ENABLE and MATE$_{13}$ OUTPUT$_{13}$ STATUS bits are used to control the wayside stream output drivers.

DESCRIPTION OF THE PREFERRED EMBODIMENT

Figure 1:
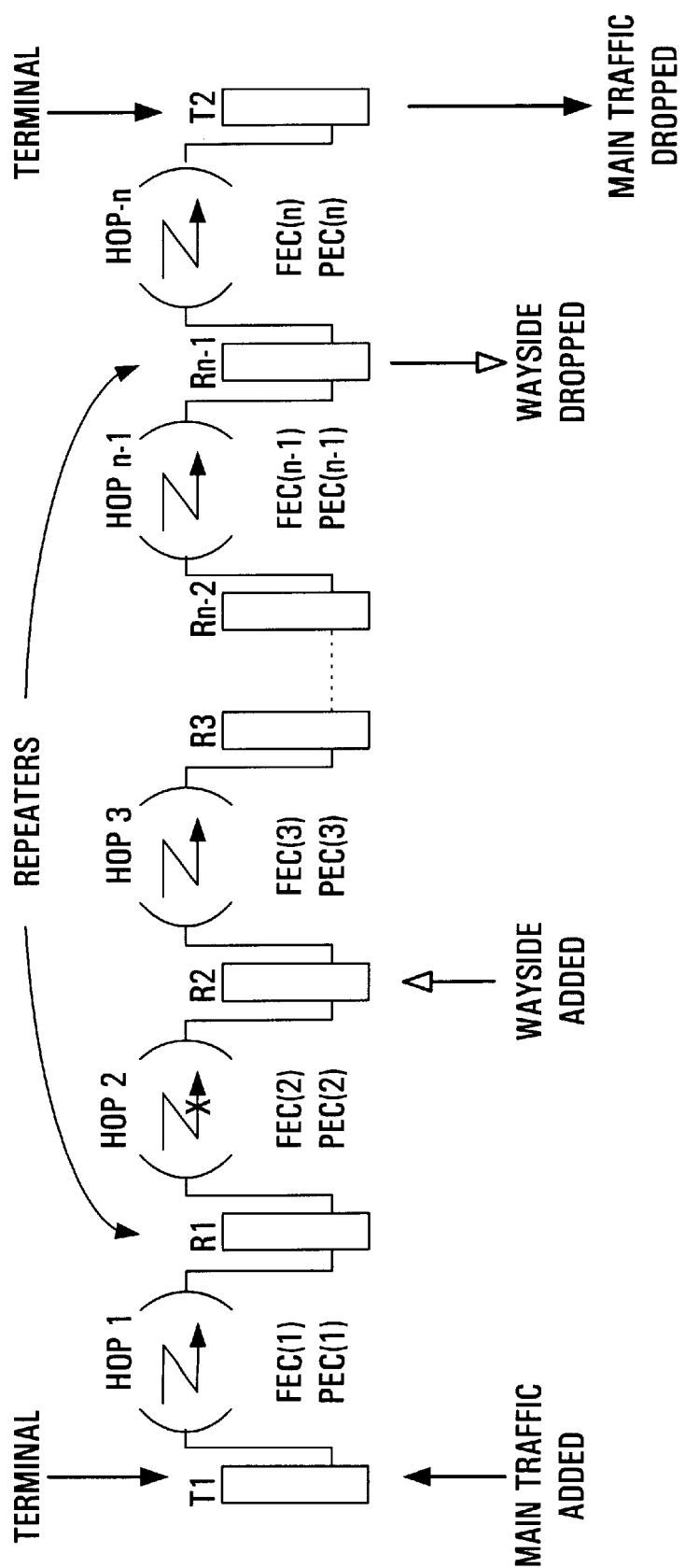
FIG. 1 is a block diagram of a radio network.

Referring to FIG. 1, main traffic protection in a terminal to terminal network will be briefly described before discussing wayside protection. The terminal comprises two communicating main traffic terminals T1 and T2 and intermediate repeaters R1, R2—Rn—1. The main traffic is added at one terminal and dropped at the other terminal. Also indicated are radio signal "hops" between the terminals via the repeaters. For a network with n hops, as shown in FIG. 1, the section FEC (FEC(i)) and section PEC (PEC(i)) for the entire traffic, including payload and overhead bytes, at each hop are checked by a radio signal processor (RSP), not shown, and accumulated along the way (from terminal T1 to terminal T2) using two ROH (radio overhead) bytes. The sum of the section FEC's and the sum of the section PEC's from T1 to T2 are defined as the line FEC and the line PEC, i.e.

$$\text{line } FEC = \sum_{i=1}^{n} FEC(i)$$

$$\text{line } PEC = \sum_{i=1}^{n} PEC(i)$$

A radio signal processor at the receive terminal T2 compares the line FEC and the line PEC with a signal failure or signal degradation threshold. If either of them is above the threshold, an interrupt SF (signal failure) or SD (signal degradation) will be set and the main traffic will be transferred to a protection channel. At repeater sites, the interrupts SF and SD are masked.

Figure 2:
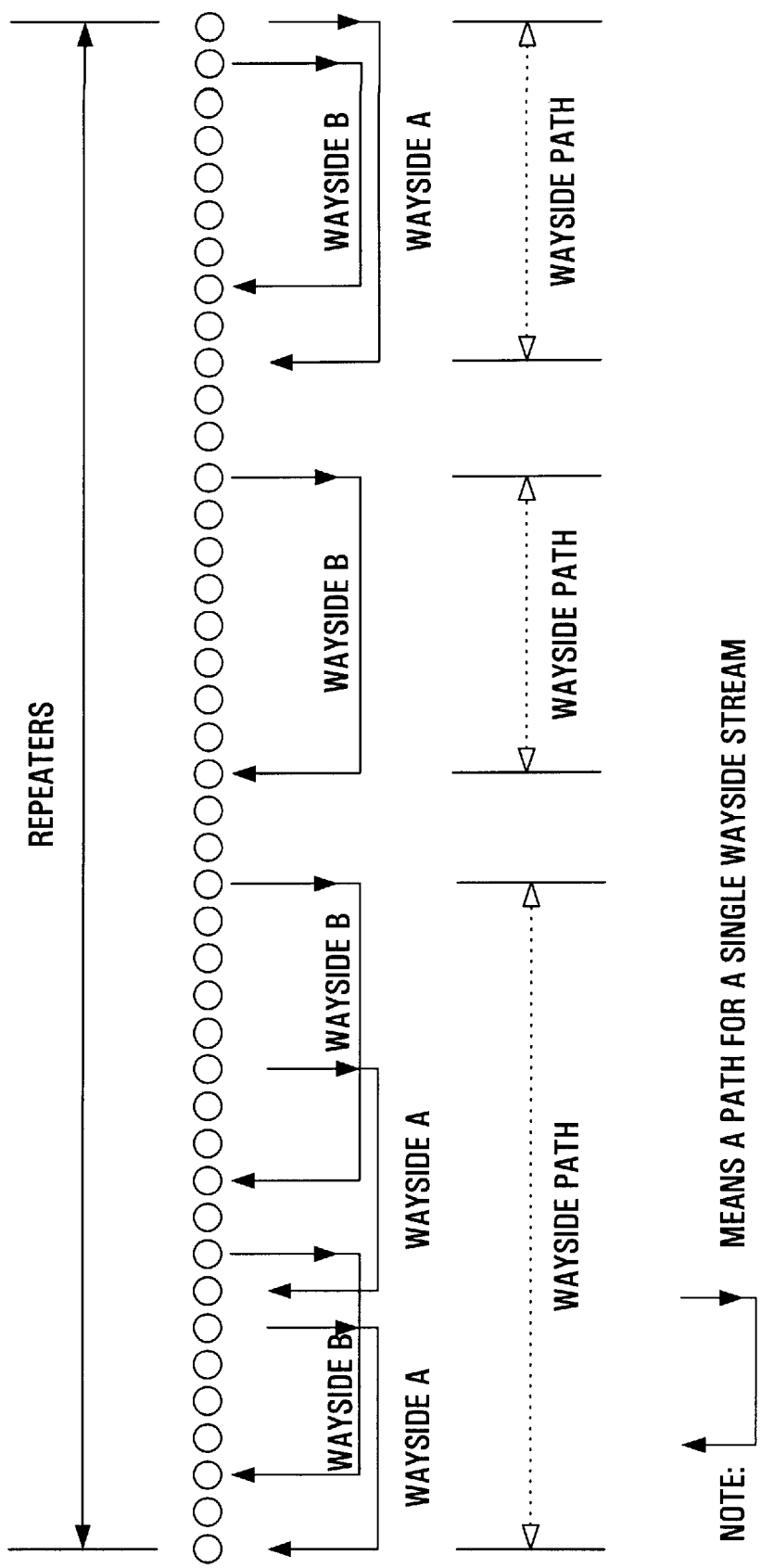
FIG. 2 schematically illustrates a line of repeaters with wayside paths.

A wayside may have a shorter path than that of the main traffic. As shown in FIG. 1, a wayside can be added at repeater R2 and dropped at repeater Rn-1. FIG. 2 schematically illustrates a line of repeaters with a number of wayside paths. There are three basic types of a wayside site: ADD, THRU and DROP. An ADD site means a wayside tributary will be added to the main traffic overhead at this site, a THRU site means a wayside tributary is added previously and will pass through this site, and a DROP site indicates a wayside tributary will be abstracted from the main traffic's overhead at this site. When there are more than one wayside stream, a site is sometimes named with the type combinations, e.g. ADD-AND-THRU, indicating some tributaries are added while some are passed through. In the case of FIG. 1, wayside protection switching caused by radio channel interferences or fading can not be performed according to SF or SD based on the accumulated FEC and PEC for the main traffic starting from terminal T1, because the radio channel failure may happen at a hop which is not on the wayside path, e.g. hop 2 in FIG. 1. Obviously, unnecessary switching may arise if the line FEC or line PEC is used to indicate the radio channel quality for the wayside. Thus, the FEC and PEC on the wayside path (in FIG. 1 it is from R2 to Rn-1) must be recorded independently in order to be able to interrupt the RSP and activate protection software at any wayside drop site.

Figure 3:
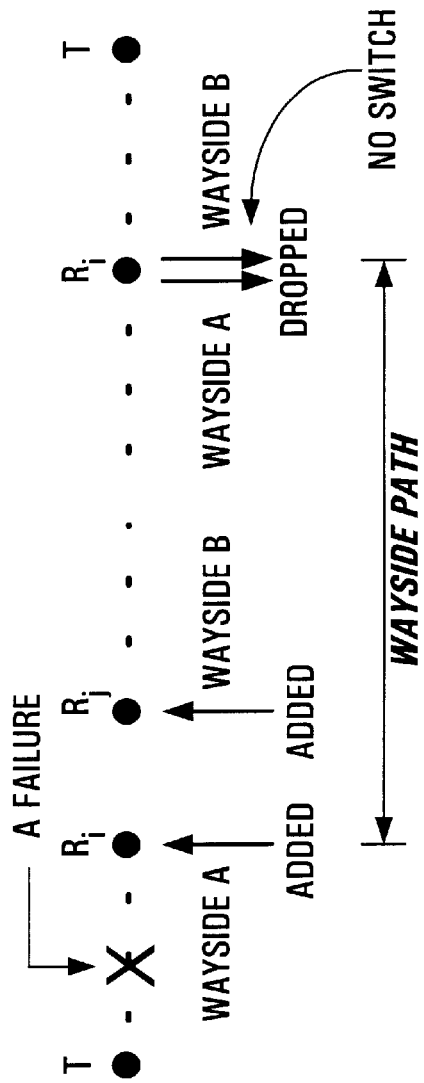
FIGS. 3 to 6 are illustrations of how repeater failures may affect wayside traffic.

In order to perform protection switching properly, the following situations need to be taken into account:

(1) A failure occurs on the radio channel but outside the wayside path, as shown in FIG. 3. In this case, the failure should not cause a wayside protection switching.

Figure 4:
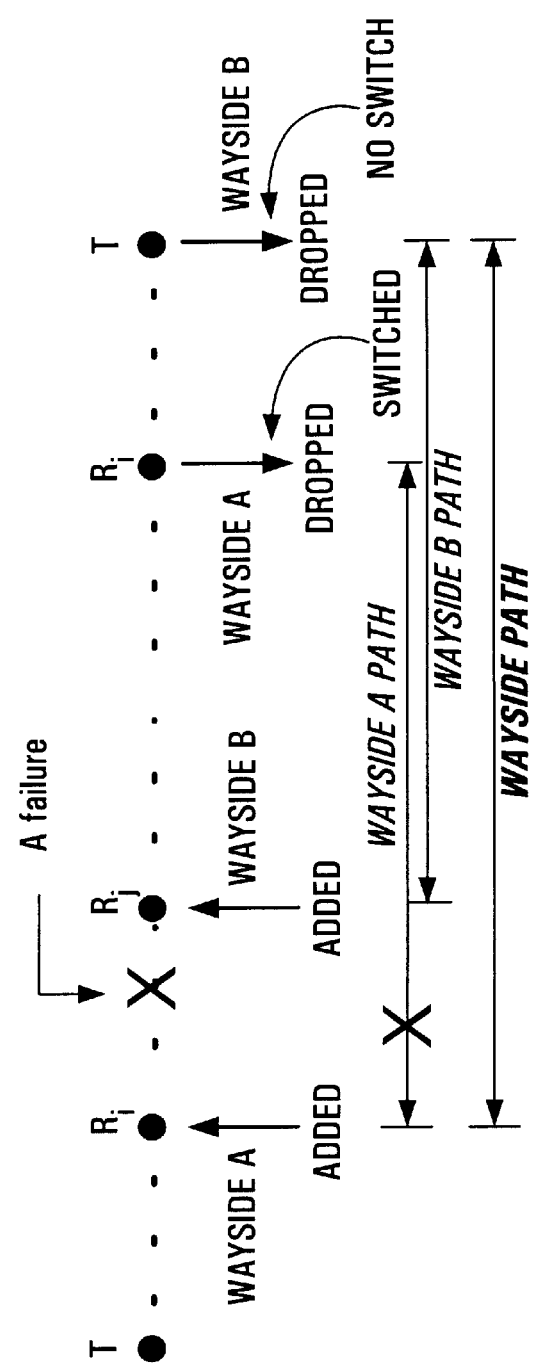

(2) A failure on the radio channel affects one wayside stream only, e.g. wayside A as shown in FIG. 4. In this case, the failure in wayside A should not cause a protection switching for the other wayside stream B.

Figure 5:
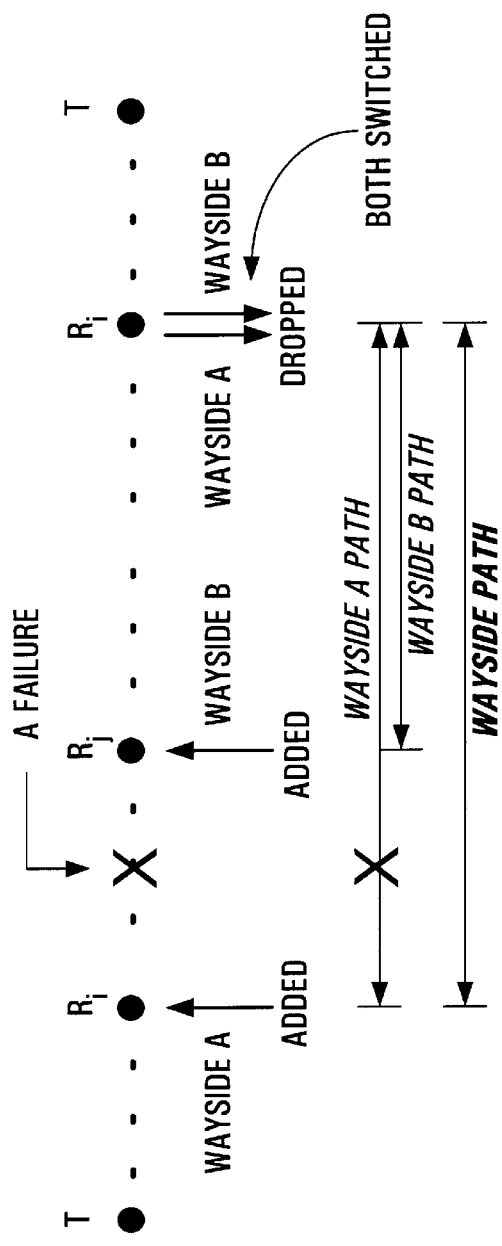

(3) A failure occurs on one wayside stream but two waysides are dropped together, as shown in FIG. 5. In this case, the uncontaminated wayside B has to be switched simultaneously with wayside A. This is because the hardware automatically switches the two waysides at the same time.

Figure 6:
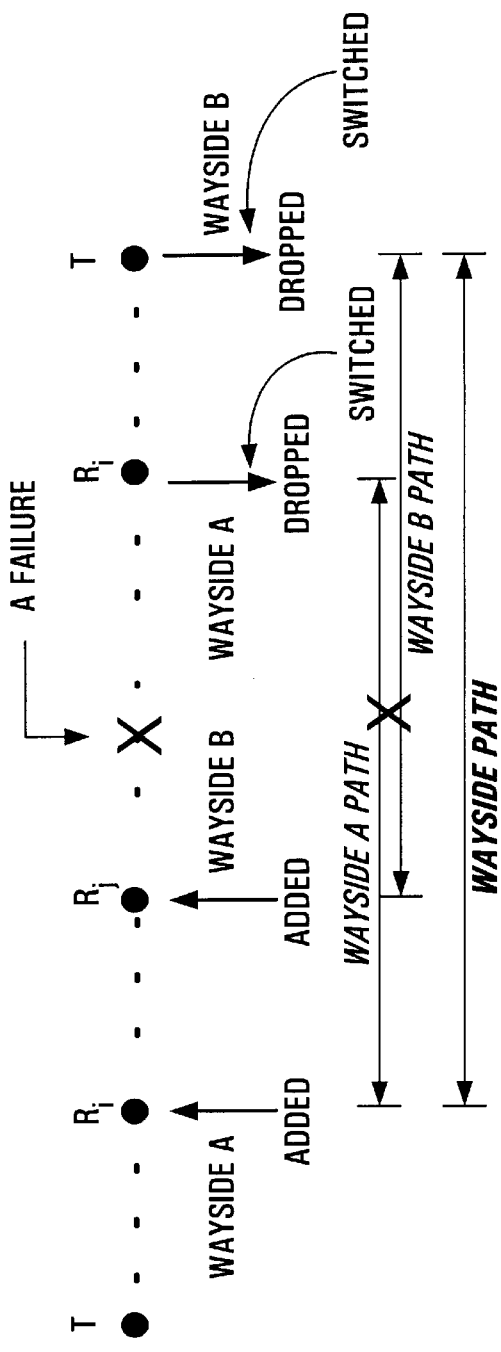

(4) A failure occurs at a point where two wayside stream paths are overlapped, as shown in FIG. 6. In this case, a protection switching should be performed at drop site(s) for both waysides.

WPSF (wayside path signal failure) and WPSD (wayside path signal degradation) are defined as two bits which indicate an FEC (forward error correction) or a PEC level on a wayside path. (PEC is parity error count.) Thresholds for setting these two bits are the same as for SF and SD in terminal-to-terminal protection switching as mentioned above.

There are three methods according to the invention for determining a wayside radio path quality and switching based on the wayside path FEC and PEC.

Method A

Each wayside path is defined separately. Twelve bits (8 for FEC and 4 for PEC) in the radio overhead are used to record wayside path FEC and PEC (referred to as FEC bits and PEC bits) for each wayside tributary. These bits are independent from those used for recording the main traffic's FEC and PEC.

a. Total Bits Needed

If there are "n" wayside tributaries carried in the main traffic overhead, there is needed:

$$N(\text{total bits}) = n \times 12 = 12\,n \text{ bits}$$

to record FEC and PEC for all wayside streams.

b. Bits Settings

At an ADD site, set the entire 12 bits corresponding to the added wayside stream to zero.

At a DROP or a THRU site, accumulate the FEC and PEC by adding the main traffic's section FEC and PEC to the FEC bits and the PEC bits corresponding to the wayside stream to be passed through or dropped.

c. Wayside Path Quality Determination

At a DROP site, the WPSF and WPSD bits will be set according to the following conditions:

WPSF=1, if the FEC and/or PEC recorded by FEC bits and PEC bits for the dropped wayside tributary are above the predetermined signal failure threshold;

WPSD=1, if the FEC and/or PEC recorded by FEC bits and PEC bits for the dropped wayside tributary is above the predetermined signal degradation threshold;

=0, if both of them are below the threshold.

A wayside protection switching process is triggered when WPSF or WPSD is set to 1. (Please refer to the software implementation in the later part of this section).

Method B

A common wayside path is defined in case of a limited availability of radio overhead bytes. Taking two waysides as an example, the common path (refer to FIG. 2) is defined as follows:

(a) Σ wayside A path+Σ wayside B path−Σ (wayside A∥wayside B), if waysides A and B are overlapped. (∥indicates the overlapped portion of the two parameters.)

(b) wayside A path OR wayside B path, if waysides A and B are not overlapped.

a. Total Bits Needed

If there is one wayside tributary carried by the main traffic's overhead, the total bits in the radio overhead for recording wayside path FEC and PEC are:

N (total bits)=12 n bits (actually this case is covered in Method "a" and will not be described hereafter).

If there is more than one wayside tributary carried by the main traffic's overhead, the total bits in the radio overhead for recording wayside path FEC and PEC are:

$$N \text{ (total bits)} = 8+4+1+2+n = 15+n \text{ bits}$$

Figure 7:
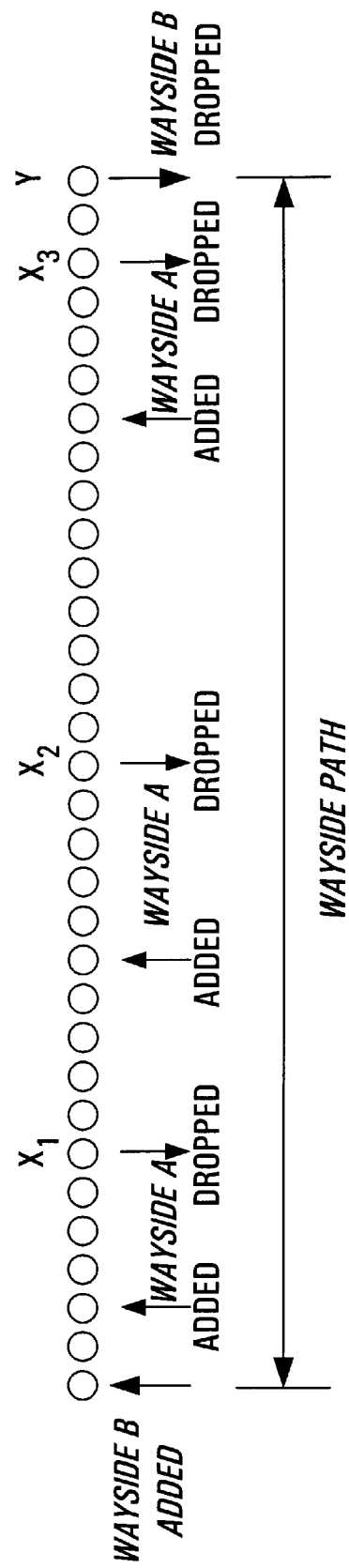
FIG. 7 illustrates a byte used in ROH (Radio Overhead) for FEC accumulation.
Figure 8:
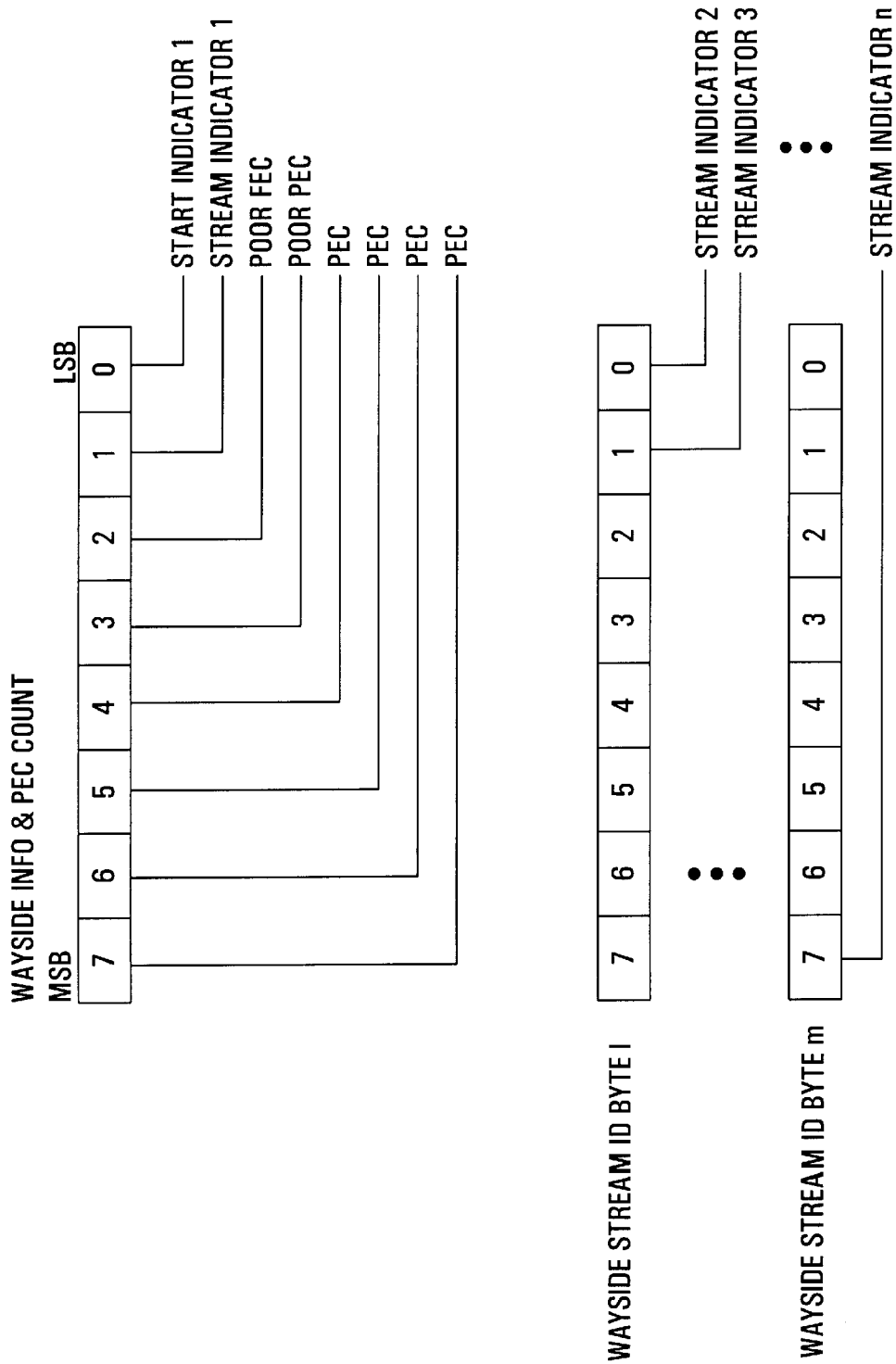
FIG. 8 illustrates a byte used for wayside information and PEC count.

Eight bits are used for wayside path FEC accumulation and 4 bits for PEC accumulation. Other bits are needed to derive the path quality. One bit is used to indicate a start of the path and two bits are for the poor FEC flag and poor PEC flag to indicate the accumulated FEC and/or PEC value above the threshold at a certain point on the path. It also needs "n" bits to define stream IDs with each of them corresponding to a stream, as shown in FIG. 7 and FIG. 8.

b. Bits Settings

At an ADD site

If all wayside streams are added into the main traffic overhead together, set the Start Indicator bit to 1 to start a wayside path and all other bits (refer to FIG. 7 and FIG. 8) to 0.

If wayside streams are added separately, set the Start Indicator bit to 1 and all other bits to 0 at the first ADD site (if one wayside is added with others passed through, the site is considered as not the first ADD site. It is referred to as a following ADD or an ADD and THRU site hereafter). At following ADD sites, check if the accumulated FEC and accumulated PEC are above the threshold. If not, no action is needed. However, if yes, there are three actions:

1. set Poor FEC and/or Poor PEC bit(s) to 1 depending on which one exceeds the threshold;
2. set Stream Indicator corresponding to the wayside stream(s) having poor FEC and/or poor PEC to 1;
3. set the FEC and/or PEC count bits which exceed the threshold to 0.

The reason for these three actions is to cope with the scenario illustrated in FIG. 4. In this case, a radio channel failure occurs before the second wayside stream is added. The above three actions ensure that a protection switching is performed at the drop site for the first added wayside. It also ensures no switching for the second added wayside stream if the FEC and PEC recorded later are below the thresholds.

At a DROP site, the main traffic's section FEC and PEC are added to the FEC count bits and PEC count bits. Set the Poor FEC and/or Poor PEC bits to 1 as well as Stream Indicator bits corresponding to the dropped streams to 1 if the accumulated FEC and/or PEC are above the threshold(s).

If all wayside streams are dropped together, the Start Indicator bit is cleared, namely set to 0.

If they are dropped separately, the Start Indicator bit is cleared when no other wayside streams are passed through at this site.

At other sites

If the Start Indicator bit is set to 1, the main traffic's section FEC and PEC are accumulated. If not, no action is required.

c. Wayside Path Quality Determination

At a DROP site, a poor wayside path quality is determined if the following condition is true:

Poor FEC and/or Poor PEC bit(s) are set to 1 AND the dropped wayside Stream Indicator(s) is set to 1.

A wayside protection switching process is triggered when the above condition is satisfied. (Please refer to the software implementation in the later part of this section.)

Method C

Figure 18:
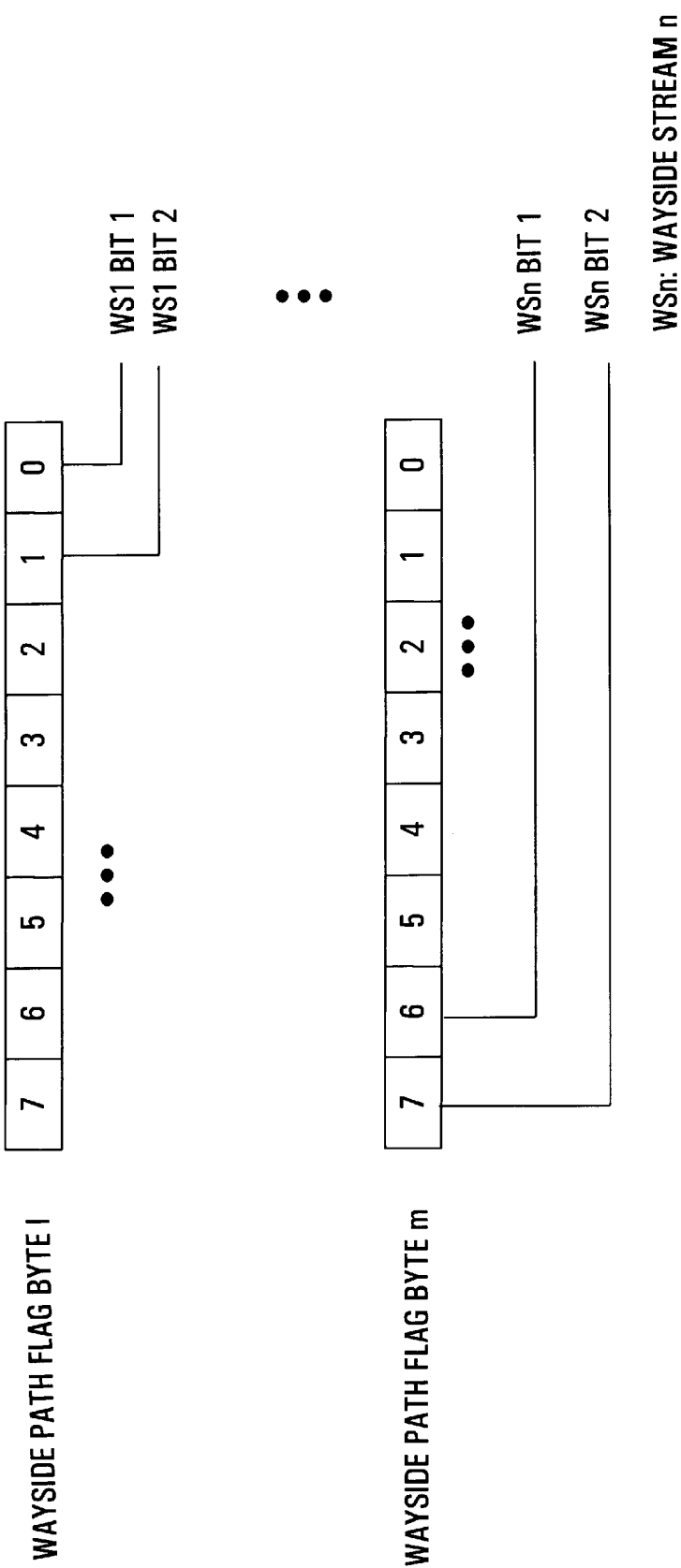
FIG. 18 is a diagram of a wayside path signal flag byte used in method "c" referred to above.

This method uses main traffic section FEC and PEC to determine the wayside radio path quality. The section FEC and section PEC are not accumulated, instead two bits in the radio overhead are used as flags to record section FEC and section PEC status for each wayside stream. See FIG. 18 and the table (supra).

a. Total Bits Needed

If there are "n" wayside tributaries, then the total necessary bits in the radio overhead are:

$$N(\text{total bits}) = 2 \times n = 2\,n$$

b. Bits Settings

At an ADD site, set both bits for the added wayside streams to 0.

At a THRU or DROP site, set the two bits to a value indicated in the table, supra, based on the described situation.

c. Wayside Path Quality Determination

At a DROP site, the WPSF and WPSD bits will be set according to the following conditions:

WPSF=1, if flag bits of the dropped wayside stream are:

$$\{bit2, bit1\} = \{0, 1\}$$

0 if otherwise

WPSD=1, if flag bits of the dropped wayside stream are:

$$\{bit2, bit1\} = \{1, 1\}$$

0, if otherwise.

A wayside protection switching process is triggered when WPSF or WPSD is set to 1. (Please refer to the software implementation in the later part of this section.)

There is one scenario which can not be covered by methods "b" and "c", but is covered by method "a".

In the case illustrated in FIG. 9, there is no burst failure appearing on the wayside path. In other words, each section FEC and PEC are below the thresholds. However, the accumulated FEC and/or PEC could be above the threshold. Remember when there is no burst failure and method "b" is used, the FEC and PEC are accumulated from the first wayside stream add site till the drop site. Therefore, for the three wayside A paths, the FEC and PEC are accumulated from the wayside B's add site until their drop sites $X_1$, $X_2$ and $X_3$. These FEC and PEC values could be much higher, even above the threshold, than the ones accumulated from their own add sites. In consequence, unnecessary switching could be initiated. If method "c" is used in this situation there will be no flag raised. As a result, protection switching could be missed.

This problem remains as an open issue for wayside protection switching using methods "b" and "c" due to ROH bytes limitation. There is no suitable solution for it currently. The probability of this scenario in a network is to be determined, but is thought to be extremely small.

Wayside protection switching is only available in a protected system configuration. The overall protection strategy is: at the transmit site, the wayside signal is bridged to two service channel overhead access (SOA) cards, shown in FIG. 10 as SOA A and SOA B, then carried on two radio channels, channels A and B; at the receive end, the better one of the two wayside channels is selected to be outputted by an auto-controlled switching, i.e. protection switching.

This redundant configuration makes protection switching possible by selecting the better of the two radio channels when dropping the wayside traffic to the customer. The radio path is protected by using a redundant radio channel to transport a copy of the wayside data, and the SOA circuit pack is protected by having a redundant SOA circuit pack from which the wayside can be selected at the site where the wayside is dropped.

The protection switching preferably satisfies the following requirements:

(a) protection switching less than 50 ms,
(b) delay between make and break less than 100 μs,
(c) customer choice of output enabling and disabling threshold, either SF or SD, set by a terminal to program a desired selection, and
(d) hooks for future modifications, such as manual switching.

However, these requirements are not essential to the basic invention.

Figure 10:
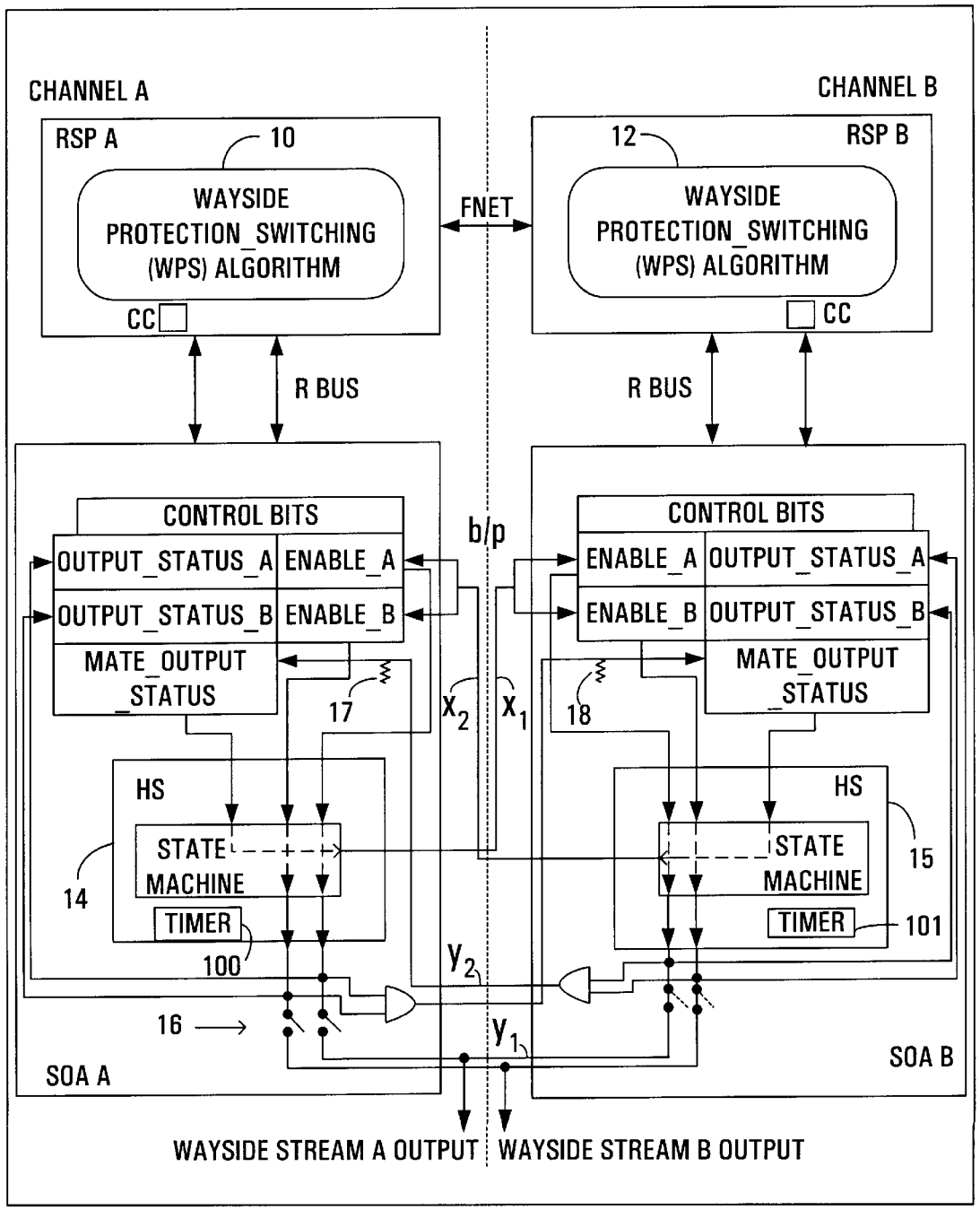
FIG. 10 is a block diagram of a wayside protection switching arrangement according to the present invention.

FIG. 10 is a block diagram of the wayside protection switching arrangement according to the present invention. The switching software is mainly composed of a Wayside Protection Switching (WPS) algorithm, i.e. WPS 10 in the Radio Signal Processor A (RSP A) in channel A, and WPS 12 in RSP B. The hardware contains a handshake (HS) unit 14 on SOA A and 15 on SOA B, each with the same state machine. The software interacts with the hardware via control signals on a bus marked RBus on FIG. 10 and data lines under common control CC.

It is proposed in the following description to use "wayside stream A (or B)" and "wayside A (or B)" to refer to the two different wayside flows on the same SOA and use "wayside A (or B) left" and "wayside A (or B) right" and "wayside channel A/B" for the duplicated wayside flows on two different SOA's. Also, to simplify the description, focus will be on one wayside stream and will not point out if it is the wayside stream A or B since they are equally handled.

For each wayside, three types of control bits, ENABLE_A(or B), OUTPUT_STATUS_A(or B) (hereinafter called ENABLE and OUTPUT_STATUS) and MATE_OUTPUT_STATUS, are applied to interface the hardware and the software. Four backplane (b/p) traces are involved to connect the two SOA cards to complete the handshaking protocol.

The ENABLE bit controls the output driver, shown as switches 16 in FIG. 10. It can be either written by the WPS or set by the mate SOA via backplane lines $x_1$ or $x_2$. If it is set by the WPS, separate values are allowed to the bits corresponding to different wayside streams if only one of them is in use. However, if it is set by the mate SOA, two ENABLE bits can only be set with the same value.

The OUTPUT_STATUS bit is used to report to the software the current wayside switches' on/off status on the own SOA. This bit can only be read by the RSP.

The MATE_OUTPUT_STATUS bit indicates if both output drivers on the mate SOA are turned off. This information is bridged between SOAs through backplane lines $y_1$ and $Y_2$. Furthermore, it participates in controlling the wayside output on the own SOA.

The "turn-on-own and turn-off-mate" switching operation in a "break before make" manner can be summarized as follows:

Step 1: The WPS enables the ENABLE BIT(s) on the own SOA, which results in a signal going through backplane line $X_i$ to disable both ENABLE bits on the mate SOA.

Step 2: The mate output drivers are then turned off based on its ENABLE bits. The driver(s) status is afterwards fedback to the own SOA via backplane line $y_i$.

Step 3: The own output driver(s) are now switched on based on the own ENABLE.

It can be seen that the "make" action is done based on a successful "break" action. The handshake unit HS not only controls the own output drivers but also is able to reset both mate ENABLE bits via the backplane. In other words, the software on one RSP may control the output drivers on two SOA printed circuit boards via the hardware.

It is obvious that the basic task of the WPS is to determine when and to what values the ENABLE bits should be set. To do so, the WPS needs to obtain and compare the wayside conditions of both wayside left and wayside right, then to decide if there is a need of switching.

Figure 19:
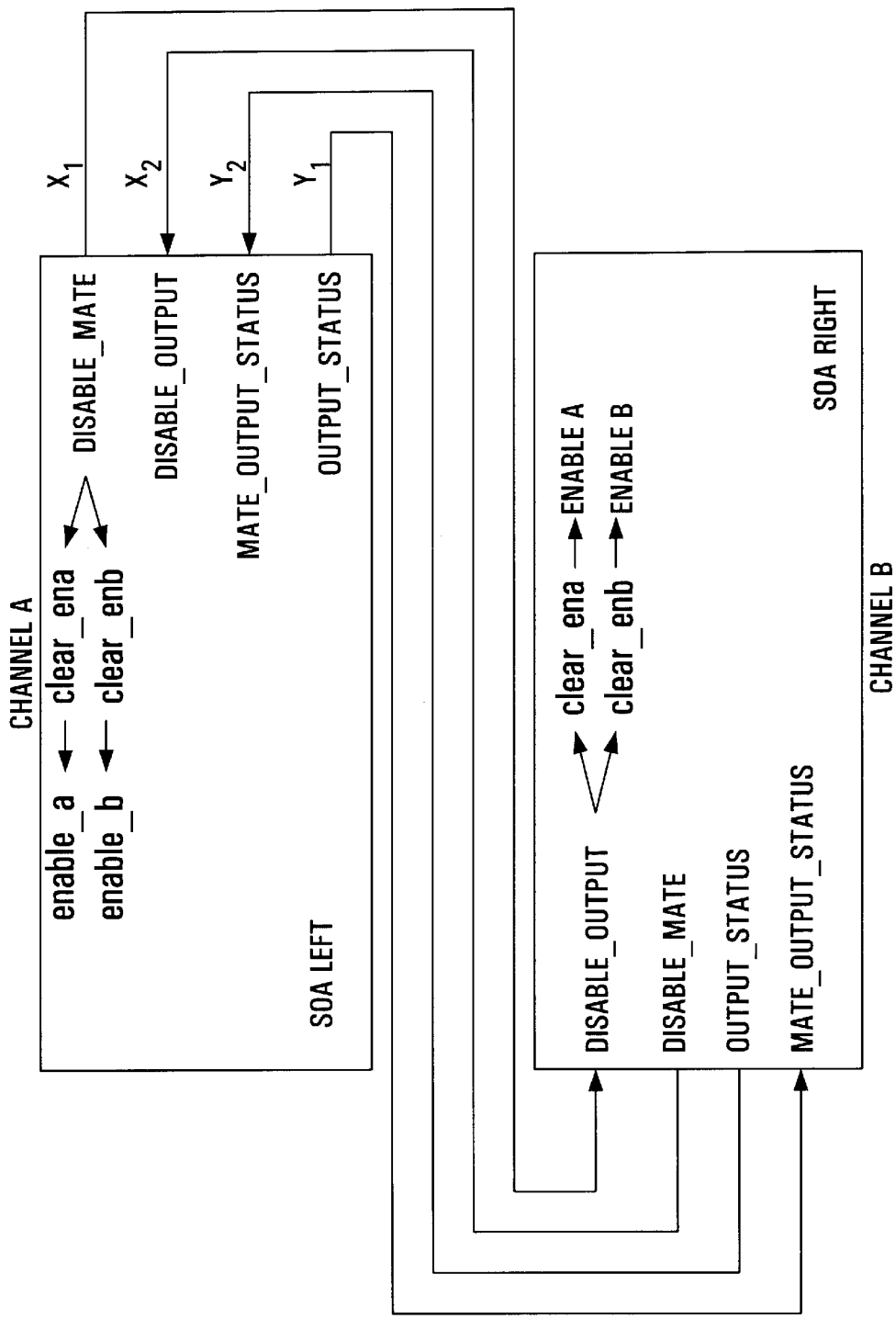
FIG. 19 is a block diagram of the wayside channel overhead access cards for channels A and B for further explaining the operation thereof.

Whether the signals $x_i$ and $y_i$ are called $x_1$ or $x_2$, or $y_1$ or $y_2$ depends on whether the observer is considering the own SOA or the mate SOA. Referring to FIG. 19, a block diagram of the wayside channel access cards for channels A and B, as well as FIG. 10, a more detailed description of the operation is as follows:

Step 1: The WPS enables the ENABLE bit(s) on the own SOA, which results in a signal going through backplane line $x_i$ to disable both ENABLE bits on the mate SOA. At the same time it starts a timer (stop watch) 100, 101.

Step 2a: The mate SOA receives the $x_i$ signal (also called DISABLE_OUTPUTS) and clears its ENABLE bits. The mate output drivers are turned off as a consequence of this.

Step 2b: Once the output drivers are turned off, the mate SOA drivers status is fedback to the own SOA via a backplane line $y_i$. If the output drivers are not turned off, their status is also fedback.

Step 3: The SOA that originated the switching activity receives the status of the mate on the $y_i$ line.

If the status says the mate SOA output drivers have been turned off before the timer expires, the timer is reset and the own drivers are turned on based on the local ENABLE bits value. Otherwise, if the timer expires before the mate SOA output drivers are turned off, the SWITCH_FAIL signal is raised and reported to the RSP to let it know the protection switching failed.

NOTE: The timer expires when it reaches 100 $\mu$s. The timer is needed to prevent the system from being locked if the mate SOA does not turn off its output drivers.

In order to make a switching decision, the WPS needs to maintain two condition records, local channel record (L-Record) and mate channel record (M-Record), which will be used to compare wayside conditions on the two channels. As shown in FIG. 11, each record contains 6 condition items. Each item is represented by one bit, indicating either a normal or a failure condition. It is noted that some conditions cover a group of monitoring points, such as CC I/F status (Common Control Interface status) and Wayside A OR B alarms status. In this case, the bit should be set if one or more alarms are true. The severity level in the table of FIG. 11 suggests a degree of influence on the wayside receive caused by the failure condition. The smaller the number, the worse it is.

An FNet message between the WPSes contains the L-Record and the switch request (if a protection switching is determined). Basically, the standby channel sends an Fnet message (L-record only) when any content of the L-Record changes; and the active channel transmits an Fnet message (a switch request plus the L-record) when a protection switching is decided. See FIG. 14.

The WPS on both active and standby channels are activated based on the following conditions:

FNet message interrupt

Monitoring points interrupt or change

The response to the FNet message activation on an active channel is to update the M-Record; on an inactive channel, besides changing the M-Record it also prepares for a switching. The response to the monitoring points activation on an inactive channel is to update the L-Record and send an FNet message to the active channel; while on an active channel the response is to update the L-Record and send an FNet message including the switching request if it is necessary.

While the protection switching is determined by the active channel algorithm, it is confirmed and performed by the standby channel. The switching control method is summarized as below:

1. When any content of the monitoring points on the standby channel changes, the WPS is activated. It updates the L-Record and sends an Fnet message to the active channel.

2. For an ideal Fnet communication, the active channel should always have the latest information on the inactive channel which is stored in the M-Record.

3. When any state of the monitoring points on the active channel changes, the WPS is activated. It updates the L-Record and compares the L-Record with the M-Record to decide if there should be a protection switching.

4. If a protection switching is determined, the active channel sends an FNet message including the switch request and the L-Record to the mate channel, and checks if the switching is done within a time limit of, for example, 100 μs. If not, the WPS reports failure to the RSP.

5. The mate (inactive channel) WPS confirms the correctness of the switch request by comparing the L-Record and the M-Record one more time. This step prevents a wrong switching decision made by the active channel due to FNet message problems, such as message collision or delay in the queue.

6. If the switch request is confirmed, the inactive channel WPS sets the ENABLE bit(s) to 1 which through the backplane trace $X_i$ switches off the mate outputs. When this is done successfully, the own MATE_OUTPUT_STATUS will be set by the mate-output-monitoring signal via another backplane line $y_i$. The own wayside output(s) is enabled based on a combination of ENABLE and MATE_OUTPUT_STATUS bits. Details for the bits definition are given in the next section. Then the WPS reports success to the RSP.

7. If the switch request is denied, the inactive WPS reports failure to the RSP.

Regarding the ENABLE bit definition, three points should be noted:

1. The output switches of two wayside streams on each SOA are independently controlled by the two corresponding ENABLE bits.

2. Both ENABLE bits can be set or cleared by the own WPS and can be cleared by the mate SOA through the backplane.

3. The last entry (by RSP or mate SOA) to set (or clear) the ENABLE bit overrides the previous state.

Figures 13, 14:
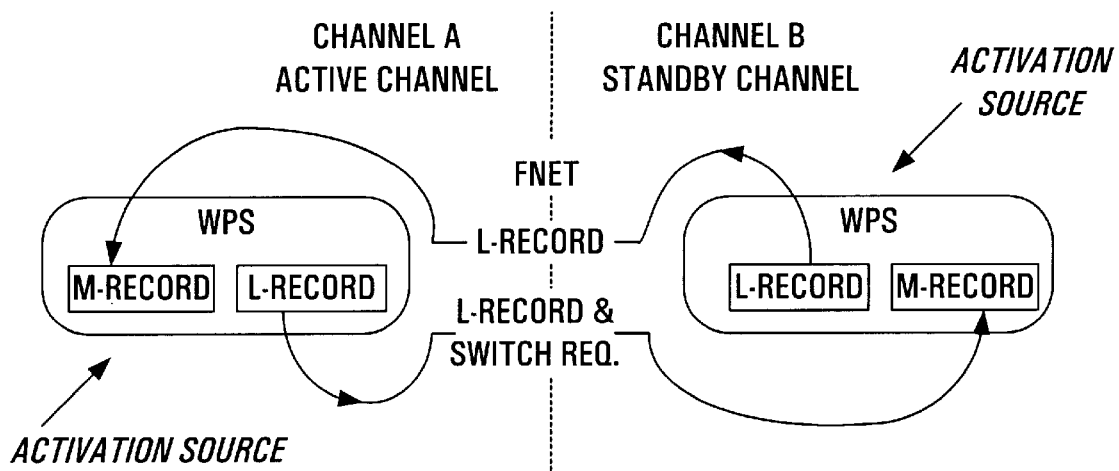
FIG. 13 is a table showing the MATE$_{13}$ OUTPUT$_{\_}$ STATUS bit settings for different output statuses of two wayside streams A and B.
FIG. 14 is a diagram of the concepts of message exchanges between two channels via a local area network referred to herein as an "FNet"

The ENABLE and MATE_OUTPUT_STATUS bits which control the wayside stream output drivers are defined in FIG. 12 and MATE_OUTPUT_STATUS bit value definitions are shown in FIG. 13.

When the ENABLE bit is set to 1 for a wayside stream, the state machine sends out a signal through the backplane to set both mate ENABLE bits to 0 which turns off the mate output drivers. The feedback signal MATE_OUTPUT_STATUS from the mate SOA combines with the own ENABLE bit value to turn on the own output driver. When the ENABLE bit is set to 0, the state machine does not send any signal to the mate SOA, instead it only switches off the own output driver. It should be pointed out that the control signal from the state machine to the mate SOA will set two mate ENABLE bits to zero simultaneously. The reason to do so attempts to simplify the backplane application.

Figure 15:
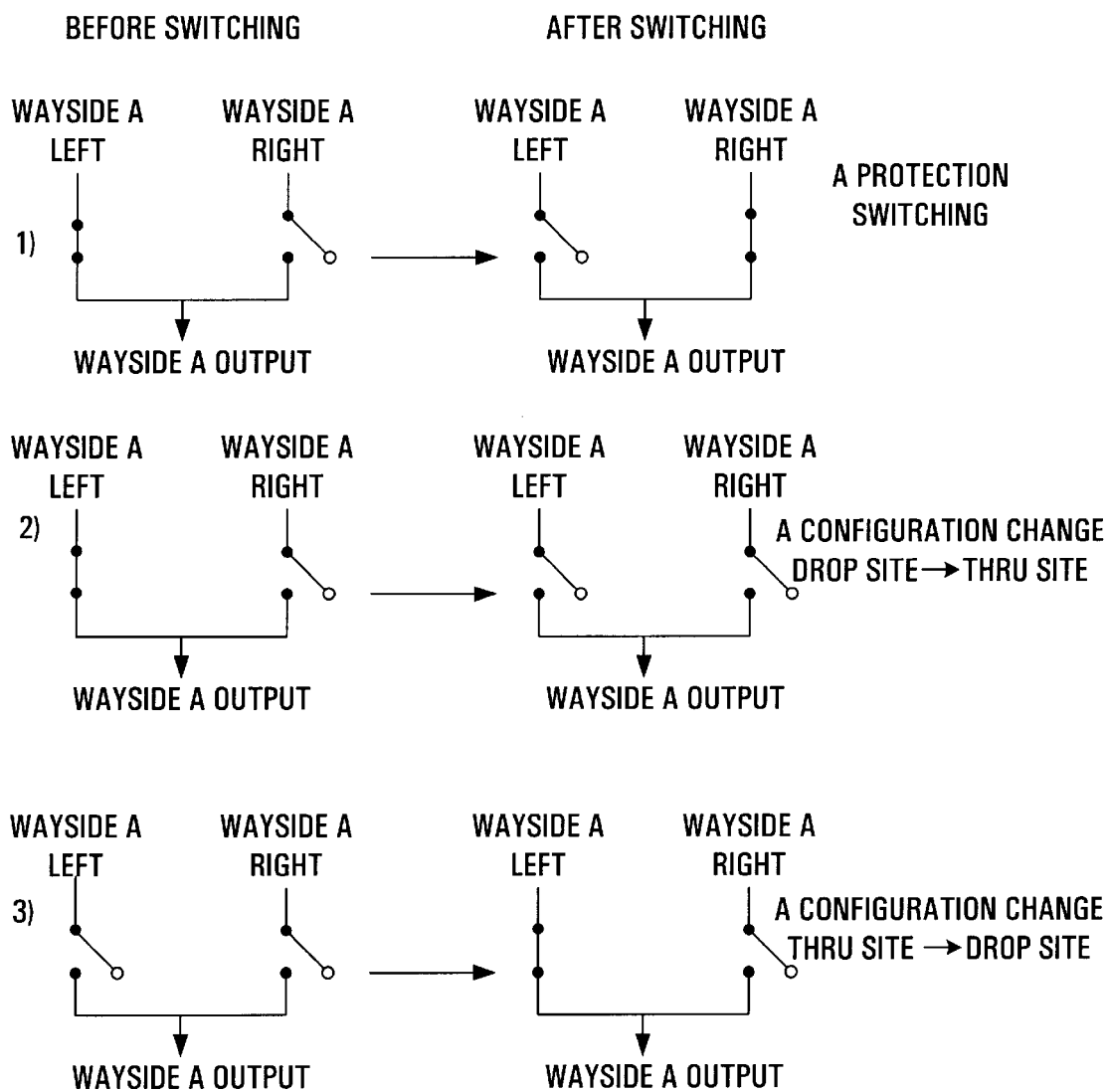
FIG. 15 illustrates three examples of wayside switching scenarios.

This ENABLE bit definition satisfies the three required switching scenarios, as shown in FIG. 15. Note the figure only takes wayside stream A as an example since the two wayside streams are controlled independently by the corresponding ENABLE bits.

Case 1 is an example of a protection switching. Wayside A left was an active channel first. When wayside A left decided a protection switching, wayside A right (the inactive channel) set ENABLE bit to 1, which made the left channel become inactive and the right channel active. Case 2 is an example of changing a drop site to a thru site. If the ENABLE bit is set to 0 on the left channel, the own output driver is turned off and there is no signal going to the mate channel. Thus both output drivers are disconnected. Case 3 is an example of changing a thru site to a drop site. This can be done by setting the ENABLE bit on left channel to 1, which results in setting the mate ENABLE bit to 0 (no influence) and turning on own switch. As a consequence, the site is changed to a drop site.

Figure 16:
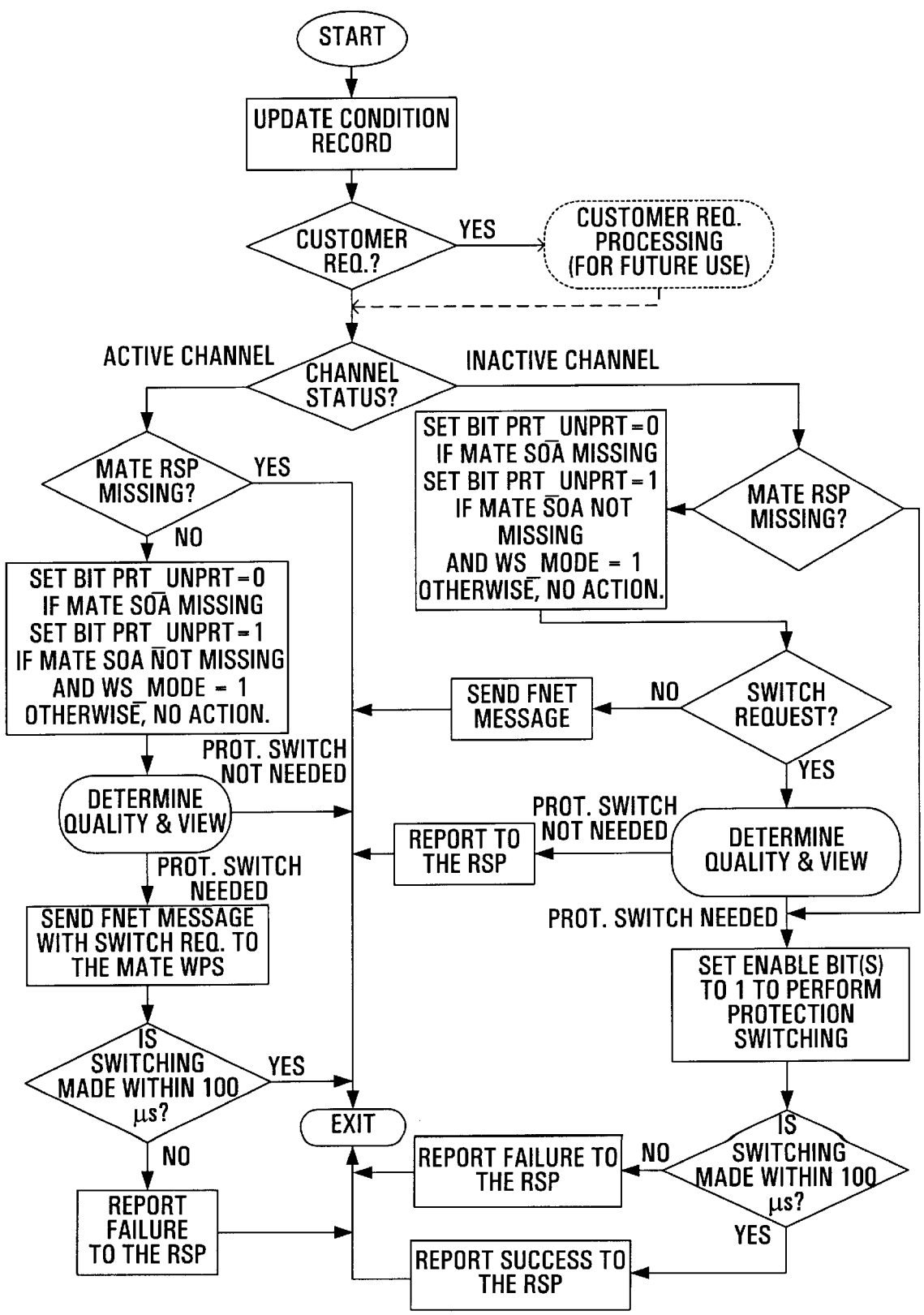
FIG. 16 is a flow chart of the algorithm used by the wayside protection switching system.

Referring to the WPS algorithm of FIG. 16, Determine Quality & View processes determine the quality of the active channels, and examines the various alarms and statuses to determine whether or not Protection switching is needed.

Figure 17:
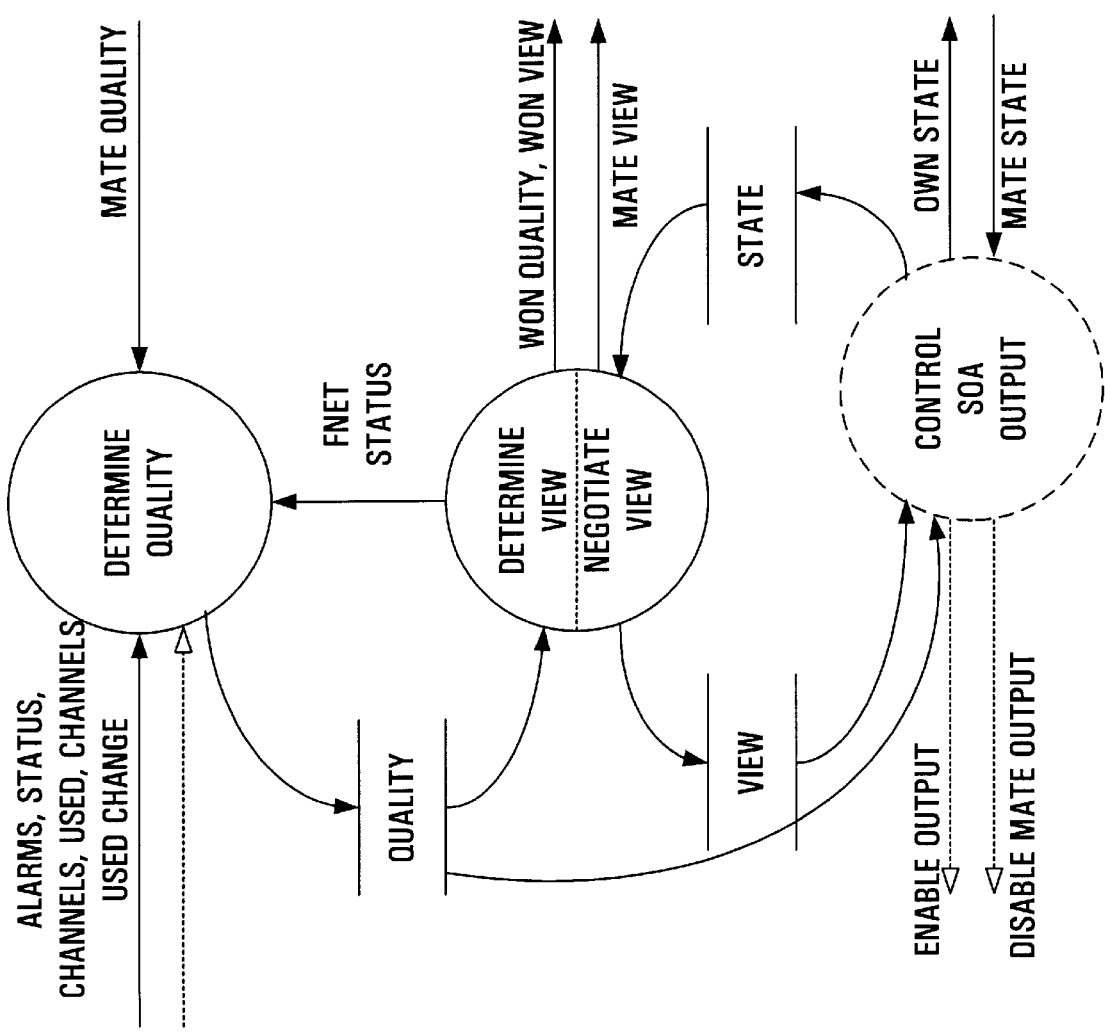
FIG. 17 is a diagram explaining the "Determine Quality & View" process of FIG. 16.

Referring to FIG. 17, the Determine Quality process determines the quality of the wayside channels being received by its own SOA unit and examines the various alarms and status to generate one rating that describes the combined quality of both wayside channels.

The Determine View process compares the own quality with the mate quality to determine its own view of which SOA unit should be outputting the wayside channels. The Negotiate View process sends the own quality and the own view to the mate RSP for agreement. Both RSPs must agree to a common view before they perform any SOA control actions.

Once a common view has been agreed to, the wayside channel must coordinate any changes to the SOA unit output control. This coordination prevents both SOA units from outputting their wayside channels at the same time.

The switching decision is made by the active channel only (checked by the mate) and the output switching is controlled by both software and hardware. It should be mentioned here that if failures occur on both left and right channels for a wayside stream, the WPS does not switch the system back and forth. The system is stable in this situation.

The other steps necessary for completing a wayside protection switching include the following procedures:

1. When the WPS is activated, the algorithm should check depending on the activation source whether the L-Record or M-Record needs to be updated.

2. The customer request handling in the next step is a hook for possible future use.

3. For the active channel, the WPS examines whether the mate RSP is missing since this information is not included in the condition record and must be checked first.

If the mate RSP is missing, there must not be any action on the active channel, even if there could be alarms.

If the mate RSP is not missing, the WPS checks if the mate SOA is missing and sets bit PRT_UNPRT in a Wayside Control Register if necessary. The value in this bit controls the application of backplane lines in protection switching. This bit is set to 1 when the mate SOA is present (protected configuration) and to 0 when the mate SOA is missing (unprotected configuration).

After processing mate SOA present status, the RSP checks both L-Record and M-Record to determine the channels quality and make a switching decision.

If the protection switching is required, the WPS will send an FNet message including the switch request and the L-Record to the mate channel. If the switching is necessary, the WPS sub-routine returns to the caller routine.

If the switch request is made, the active channel checks if the switching action is done within 100 μs. If not, it will report failure to the RSP. If yes, switching has been performed.

4. For the inactive channel, if the mate RSP is missing, the WPS must perform a switching immediately by setting the ENABLE bit(s) to 1. If the mate RSP is present, it looks at the mate SOA present status and checks if there is the switch request from the active channel. If no, it sends an FNet message with L-Record only to the mate channel. If the switch request is true, it goes through the procedure of determining the channels quality and switching view one more time to confirm the correctness of making a protection switch.

if the protection switching is confirmed, it sets the ENABLE bit(s) to one and checks the OUTPUT_STATUS bit(s) to see if the switching is done within 100 μs. If yes, it reports success to the RSP; if no, it reports failure. If the protection switching is denied by DETERMINE QUALITY & VIEW, it reports to the RSP and exits.

NOTE: it is not necessary to reply to the mate (former active) WSP whether or not the switching is performed since:

a. if the switching is successfully done, the active WPS will know by the own OUTPUT_STATUS and MATE_OUTPUT_STATUS bits change and the success will be reported to the RSP by the inactive channel;

b. if the switching is not performed due to failing in the mate confirmation, both the active and the inactive WPS will report to the RSPs (the active WSP will know the failure by checking if the OUTPUT_STATUS bits have not been cleared within a certain amount of time);

c. if the switching is not done due to losing the FNet message, the active WSP will know this (as described in the above) and report to its RSP by itself only.

State Machine Description

Figure 20:
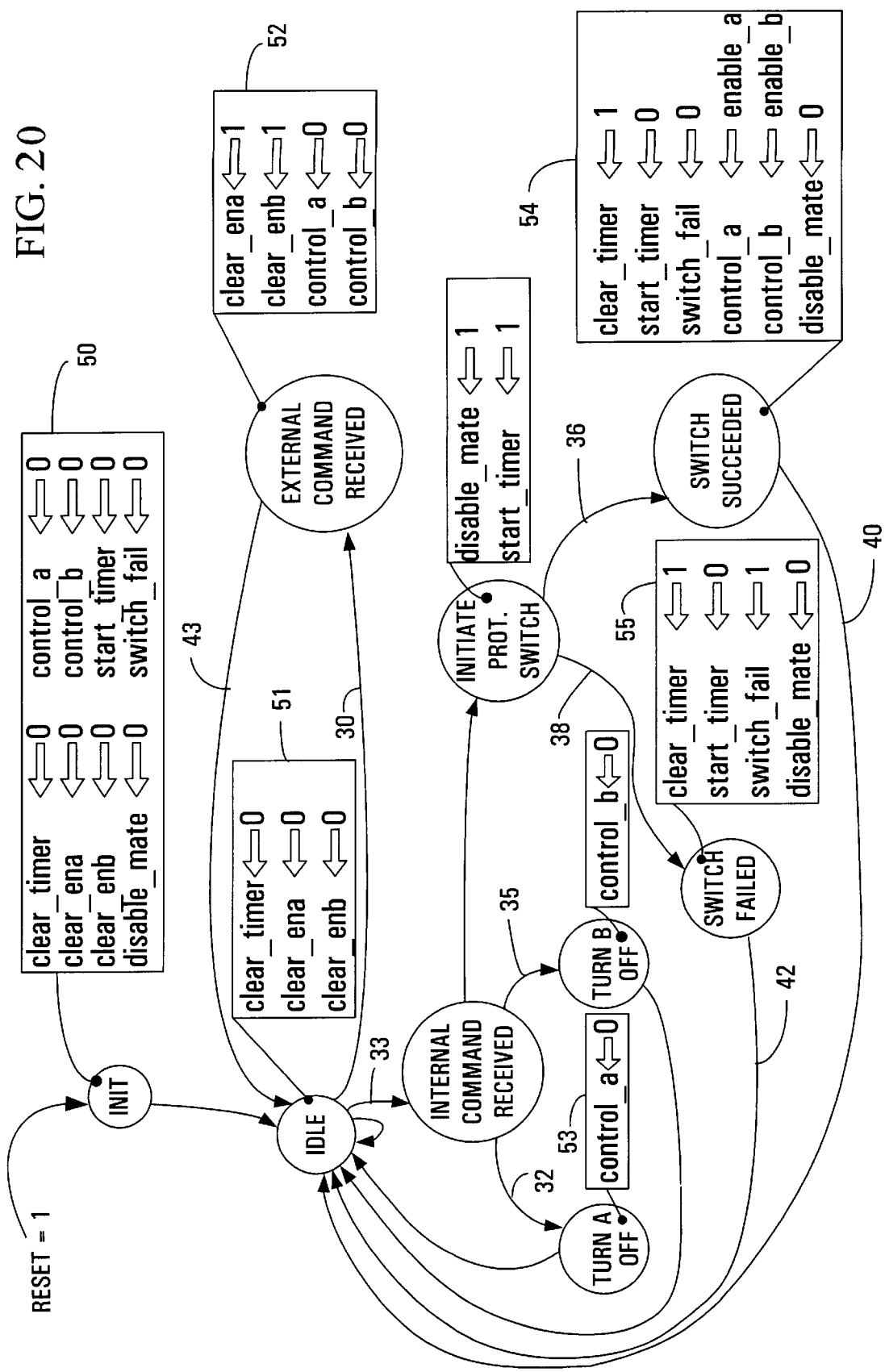
FIG. 20 is a state diagram for explaining the operation of the state machines shown in FIG. 1.

Referring to FIG. 20, the state machine will now be described.

INPUTS (not shown, except for reset)

reset: Reset at startup clk: Clock enable_a: This bit is used in controlling the local output driver's status as well as the $x_i$ (DISABLE_MATE) signal going to the mate SOA. When set to '1', this triggers the state machine to initiate a protection switch. When set to '0', the local output driver for wayside stream A is turned off.

enable B: See enable_a, but when set to '0', turns off stream B.

output_status_a: This signal reports the actual status of the output driver A.

output_status_b: Status of output driver B. When reporting '1' the local output drivers are turned ON. When reporting '0' the local output drivers are turned OFF.

mate_output_status: This signal reports the status of the mate SOA output drivers. When reporting '1', either or both output drivers on the mate SOA are turned on. When reporting a '0', both output drivers on the mate SOA are turned off.

disable_output: This is a signal coming from the mate SOA. When '1', the mate SOA and RSP want to take control by initiating a switch (see step 2a, supra). When '0', the mate SOA and RSP are not requesting a switch.

timeout: This reports the status of the timer to the state machine. When '1', the timer has exceeded its limit. When '0', the timer has not exceeded its limit or is inactive.

outputs (Shown in Rectangular Blocks in FIG. 20)

clear_ena: This signal will effectively cause the ENABLE_A bit to be cleared.

clear_enb: This signal will effectively cause the ENABLE_B bit to be cleared.

Both clear_ena and clear_enb are active high signals.

control_a: This is a control signal to the local output driver A (stream A).

control_B: This is a control signal to the local output driver B (stream B). When '1', turns on the output driver (of stream A or B or both). When '0', turns off the output driver (of stream A or B or both).

output_status: This reports the local output driver status to the mate. It is actually the result of ORing the local drivers statuses.

disable_mate: This is a signal sent to the mate SOA to tell it to turn its output drivers off so that the local SOA can turn its own drivers on. This is an active high signal.

start_timer: This signal causes the timer to start counting.

clear_timer: This signal causes the timer to stop counting and to be reset to 0.

switch_fail: This signal is set to '1' if the mate SOA does not turn off its drivers before the timer expires.

NOTE: The state machine is synchronous and the inputs are synchronized to the clock before entering the state machine. This means that input signals may have been synchronized by a process external to the state machine.

The protection switching state machine activity can be described as follows:

The clock input signal (clk) synchronizes the operations of the state machine. Transitions from one state to another occur on the rising edge of the clock only. In FIG. 20 the circles represent states.

When the power has been applied to the system and has stabilized, the reset signal puts the state machine in the Init state, where all the output signals are set to zero (block 50).

The next state, Idle, is reached by default. In this state, the machine waits for commands from either the mate SOA (disable_outputs) or the local RSP (ENABLE_A or ENABLE_B). When a command is received, the current output status for outputs A and B are compared with the command and actions are taken. During this state the timer control signals are set to their default values (timer stopped), and the signals to clear the ENABLE_A and ENABLE_B bits are de-activated (clear_ena and clear_enb are de-activated, box 51).

If the external command disable_outputs is received, and if the local output statuses show that either or both drivers are turned ON, the machine proceeds to the External Command Received state. Otherwise, no action is taken and the machine remains in the Idle state.

In the External Command Received state, the machine sends a clear_ena and a clear_enb signal to the ENABLE_A and ENABLE_B control bits to clear them. At the same time, it sends the control signal control_a to the output driver A to physically turn it off, and control_b to the output driver B to physically turn it off. See box 52. Normally, the drivers should turn off within a few nanoseconds. The output_status_a and output_status_b signals should be updated to reflect that the output drivers are turned off. This in turn causes the output_status signal to be updated. Note that these two signals are continuously reporting the output status of the drivers during all states, not only during this state. Then the state machine proceeds back to the Idle state (arrow 43).

In the case that an internal command is received from the RSP, it is validated to see if the command differs from the actual status of the drivers. If the following equation is true (=logic 1), (enable_a xor output_stat_a) or (enable_b xor output_stat_b), then a new order has been received and the state machine proceeds, arrow 33, to the Internal Command Received state to see in detail which driver to turn on or off.

In the Internal Command Received state, there are three possible scenarios. The first two scenarios are similar. Either wayside stream A or B should be turned off. In this case the state machine proceeds to Turn A off, arrow 32, if ENABLE_A is 0, or Turn B Off, arrow 35, if ENABLE_B is 0. If both are to be turned off, the state machine will loop a second time (go back to Idle, Internal Command Received and Turn A(B) Off) to turn the other one off. The order in which they are turned off is irrelevant.

In the Turn A Off state, the control_a signal is set to 0, box 53, to physically turn off output driver A. Normally, the output driver A is turned off and the output_status_a and output_status_b are updated.

The Turn B Off state is similar to the Turn A Off state, but for the B output driver.

The third scenario, where the command is to turn on either A or B or both, is more complex. Before turning on the local output drivers, the local SOA must be certain the mate SOA output drivers are no longer active, otherwise permanent electrical damage to the invention's equipment or to other equipment connected thereto may be incurred. To prevent damage, the state machine guarantees the drivers will never be turned on on the local SOA until the mate has turned off its drivers. So if ENABLE_A or ENABLE_B are set to 1 (either or both), the machine proceeds to the next state which is Initiate Prot. Switch.

In the Initiate Prot. Switch state, the disable_mate signal is sent to the mate SOA using the backplane traces $x_i$. The mate SOA should receive this signal as the disable_outputs signal and since it runs the same state machine, it should enter the External Command Received state. But let's concentrate on the local SOA. At the same time the disable_mate signal is sent, a timer is started. The next state depends on how quickly the mate SOA turns its drivers off. If the mate SOA turns its drivers off before the timer expires (i.e. mate_output_status from the $Y_i$ line becomes a 0 before timeout becomes a 1), the switching activity can be completed and the machine transitions, arrow 36, to the Switch Succeeded state. Otherwise, if the timer expires (timeout goes to 1) then the switching activity fails. A transition, arrow 38, to the Switch Failed state occurs in this case.

In the Switch Succeeded state, the switching activity can be completed. The timer is stopped and cleared, the disable_mate signal can be set back to 0 to be ready for the next time and the local output driver control signals are set to be equal to the ENABLE_A and ENABLE_B control bits. See box 54. The machine proceeds, arrow 40, to the Idle state by default after this state.

In the Switch Failed state, the switching activity must be interrupted. A failure to switch and to turn on the local output drivers is reported to the RSP using the switch_fail signal. The timer is cleared and stopped. The disable_mate is cleared in preparation for possibly a next trial. See box 55. The local output drivers are not turned on. The machine proceeds, arrow 42, to the Idle state by default after this state.

Note that in the case where the mate SOA is not present, a pull-down resistor 17, 18 on the mate_status line will guarantee the switch will happen since the absence of the mate SOA is equivalent to having its drivers turned off.

Figure 21:
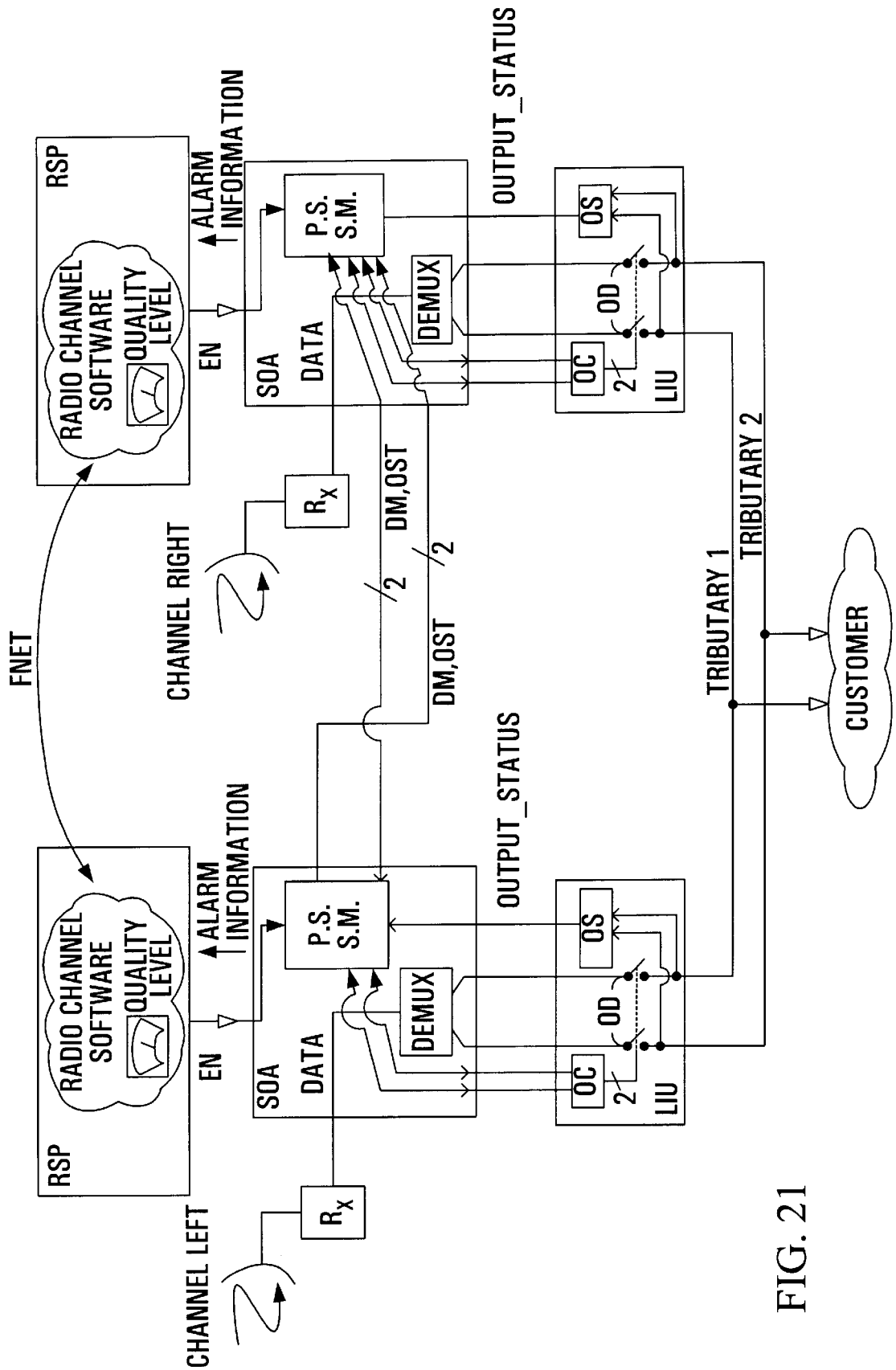
FIG. 21 is a block diagram of the protection switching system.

FIG. 21 illustrates two radio channels, channels left and right, receiving the same data. This is a redundant configuration with path and equipment protection.

The following list explains the meaning of the abbreviations used in FIG. 21:
OD: Output Drivers
OS: Output Sensor
OC: Output Control
RX: Radio Receiver
DEMUX: Demultiplexer extracting the two tributaries
PSSM: Protection Switching State Machine
DM: Disable Mate Signal (to Mate)
OST: Output Status Signal (to Mate)
EN: Enable Local Output Drivers
data: data (payload). Contains the 2 tributaries
LIU: Line Interface Unit A software runs on both channels and monitors the quality of the data received by the SOA.

The two RSPs exchange the quality level of the data and control the two LIUs to always send to the customer the highest quality signal.

When the quality level of a channel becomes lower than the other channel, a protection switch is made to the higher quality channel, i.e. the output drivers on the low quality channel are opened and the output drivers (OD) on the higher quality channel are closed, and the customer receives the higher quality data signal.

The operation just described (open drivers on low quality channel and close drivers on higher quality channel) used to be under the control of the radio channel software (S/W). The S/W used to send the command to turn the drivers off on its local channel, wait for the output sensor to confirm this by polling the SOA, send a message on the FNet to the mate channel S/W. Then the mate channel RSP took over and sent a command to its SOA to close its drivers. At this point, the hardware switch from one SOA to the other was done. This whole process was, however, leaving the customer without data for several milliseconds (amount of time between opening the first drivers and closing the drivers on the other SOA).

To reduce this long delay, a hardware solution was necessary. A protection switching state machine was designed.

Its main feature is that once the system software has decided which channel has the higher quality, only ONE software operation is required to switch channel. No more polling or messaging on the FNET. The only command from S/W is sent to the SOA it wants to use, and the SOA will take care of turning OFF the other card before it turns on its own drivers.

Switching is handled by a state machine running in hardware thousands of times faster than when run in software. The state machine is described above in connection with FIG. 20.

Figure 22:
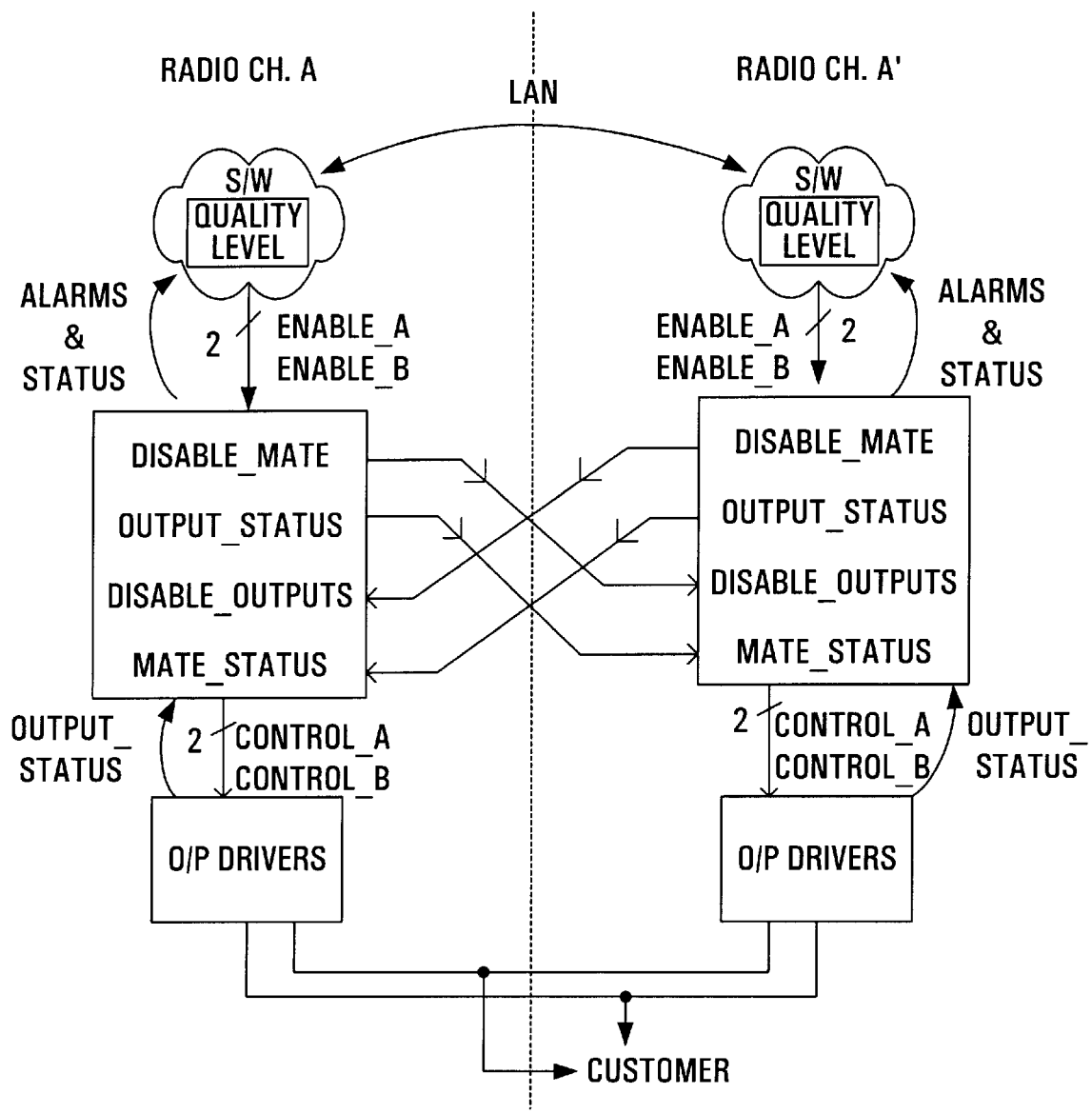
FIG. 22 is a block diagram of the interconnections of the two radio channels.
Figure 23:
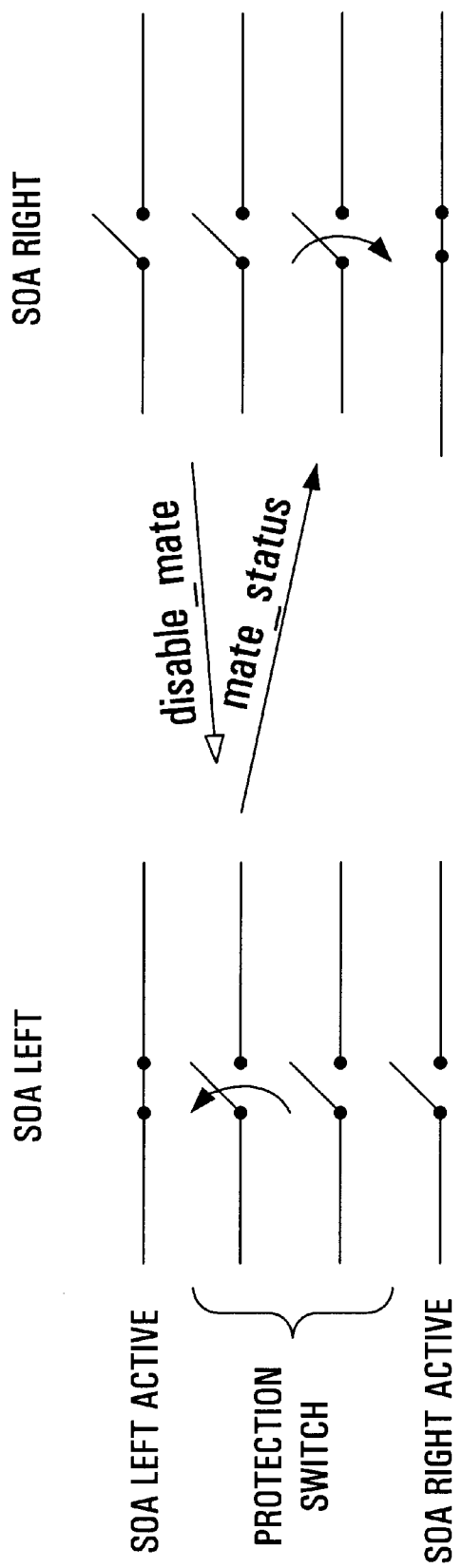
FIG. 23 is a diagram of switching activity.

FIG. 22 shows the interconnections of two SOA's.

Advantages of the Hardware Method Over the Software Controlled One

Switching actually performed in nanoseconds instead of milliseconds.
Results in minimal hit duration for the customer.

At $2Mb/s \rightarrow 1$ $ms$=2000 bits are hit when SWITCHING in S/W

1 $\mu s$=2 bits are hit when SWITCHING in H/W

500 $ns$=0.5 $\mu s$=1 bit is hit when SWITCHING in H/W.

(The H/W examples assume a 20 MHz clock.)
Reduces by a factor of 20 the number of bit errors. When the state machine of FIG. 20 is used: switching is done in 3 clock cycles→i.e. 50 ns→less than one bit!

The switching time is the time elapsed between the opening of the switch on channel A and the closing of the switch on channel B. During this short period of time, the data is not sent to the customer equipment. In this situation it can be said that the traffic is "hit", and the switching operation is qualified as non-hitless, as opposed to a "hitless" switching action that does not interrupt traffic.

Two factors contribute to the fact that the wayside protection switching is non-hitless: the switching time and the differential delays between adjacent radio channels. In the present case, the switching time has been reduced to less than one data bit, so the switching time is not causing traffic hits. However, there is no differential delay adjustment between two adjacent wayside radio paths, which might cause the protection switching operation to be non-hitless. Note that there is differential delay adjustment between radio sites in a SDH/SONET radio network, but not at the wayside traffic level.

We claim:

1. In a SONET/SDH radio communication network comprising a plurality of main radio communication terminals and a plurality of repeaters intermediate the communication terminals, with wayside communication paths being established between pairs of said repeaters via two radio channels carrying the same data, a method for determining whether to effect protection switching of a wayside path to the better of said two channels, comprising using different radio overhead bits to record, for each of a plurality n of wayside tributary paths, FEC (Forward Error Correction) and PEC (Parity Error Count) using t=f+p bits for each tributary path (f for FEC and p for PEC), subject to the following conditions:

(1) at an ADD site, set to zero the entire t bits corresponding to the added tributary, (2) at a DROP or THRU site, accumulate the section FEC and PEC by adding the main traffic's section FEC and PEC to the FEC bits and the PEC bits corresponding to the wayside stream to be passed through or dropped, and (3) at any DROP site, compare the FEC and PEC corresponding to the tributary to be dropped with predetermined thresholds to determine whether protection switching is required.

2. A method as claimed in claim 1, wherein, at a drop site, WPSF (Wayside Protection Signal Failure) and WPSD (Wayside Protection Signal Degradation) bits are set according to the following conditions:

WPSF=1, if the FEC and/or PEC recorded by FEC bits and PEC bits for the dropped wayside tributary are above a predetermined signal failure threshold;
  =0, if both of them are below the predetermined signal failure threshold;

WPSD=1, if the FEC and/or PEC recorded by FEC bits and PEC bits for the dropped wayside tributary is above a predetermined signal degradation threshold;
  =0, if both of them are below the predetermined signal degradation threshold; and wherein a wayside protection switching process is triggered when WPSF or WPSD is set to 1.

3. In a SONET/SDH radio communication network comprising a plurality of main radio communication terminals and a plurality of repeaters intermediate the communication terminals, with wayside communication paths being established between pairs of said repeaters via two radio channels carrying the same data, a method for determining whether to effect protection switching of a wayside path to the better of said two channels, comprising making a switching decision by using one common wayside path to calculate FEC (Forward Error Correction) and PEC (Parity Error Count), switching being effected if FEC or PEC exceed predetermined thresholds, said common wayside path being defined as follows:

(a) $\Sigma$ wayside A path+$\Sigma$ wayside B path −$\Sigma$ (wayside A ∥wayside B), if waysides A and B are overlapped (∥indicates overlapped portions of the two parameters.)

(b) wayside A path OR wayside B path, if waysides A and B are not overlapped.

4. A method as claimed in claim 3 wherein, for one wayside tributary carried by the main traffic's overhead, the total bits in the radio overhead for recording wayside path FEC and PEC are:

$$N(\text{total bits})=12 \text{ bits}.$$

5. A method as claimed in claim 3, wherein, for n wayside tributaries carried by the main traffic's overhead, the total bits in the radio overhead for recording wayside path FEC and PEC are:

$$N(\text{total bits})=8+4+1+2+n=15+n \text{ bits},$$

eight bits being used for FEC accumulation, four bits for PEC accumulation, one bit to indicate the start of a path, two bits for a poor FEC flag and poor PEC flag to indicate the accumulated FEC and/or PEC value above the threshold at a certain point on the path and n bits to define stream ID's.

6. A method as claimed in claim 5 wherein, at an ADD site at which all wayside streams are added into the main traffic overhead together, the start indicator bit is set to 1 to start a wayside path and all other of said bits are set to zero.

7. A method as claimed in claim 5 wherein wayside streams are added separately, the start indicator bit being set to 1 and all other bits to 0 at a first ADD site.

8. A method as claimed in claim 7 wherein, at following ADD sites, a check is made as to whether the accumulated FEC and accumulated PEC are above a threshold, no action being taken if they are not.

9. A method as claimed in claim 8 wherein, if the accumulated FEC and accumulated PEC are above a threshold the following actions are taken:

1. set Poor FEC and/or Poor PEC bit(s) to 1 depending on which one exceeds the threshold;
  2. set Stream Indicator corresponding to the wayside stream(s) having poor FEC and/or poor PEC to 1;
  3. set the FEC and/or PEC count bits which exceed the threshold to 0.

10. A method as claimed in claim 9 wherein, at a DROP site, the main traffic's section FEC and PEC are added to the FEC count bits and PEC count bits.

11. A method as claimed in claim 10 wherein, if the accumulated FEC and/or PEC are above the threshold(s), the poor FEC and/or poor PEC bits are set to 1 together with the stream indicator bits corresponding to the stream dropped at said DROP site.

12. A method as claimed in claim 11 wherein, if all wayside streams are dropped together, the start indicator bit is cleared, i.e. set to 0.

13. A method as claimed in claim 12 wherein, at sites other than ADD and DROP sites, the main traffic's section FEC and PEC are accumulated if the start indicator bit is set to 1, whereas no action is taken if the start indicator bit is set to 0.

14. A method as claimed in claim 13 wherein, at a DROP site, a wayside protection switching process is triggered if the poor FEC and/or poor PEC bit(s) are set to 1 AND the dropped wayside stream indicators) is set to 1.

15. In a SONET/SDH radio communication network comprising a plurality of main radio communication terminals and a plurality of repeaters intermediate the communication terminals, with wayside communication paths being established between pairs of said repeaters via two radio channels carrying the same data, a method for determining whether to effect protection switching of a wayside path to the better of said two channels, comprising:

setting 2 bits (bit 1, bit 2) of a wayside path signal flag byte to 0 at an ADD site to indicate FEC (Forward Error Correction) and PEC (Parity Error Count) quality for each wayside tributary, 2 n bits being used in the case of n wayside tributaries; and setting at a THRU or DROP site the two bits for a particular wayside tributary to bit 1=0,bit 2=0 if the section FEC and PEC are below a switching threshold and the wayside path is normal; to bit 1=0,bit 2=1 if the section FEC and PEC are above a SF (Signal Failure) threshold; to bit 1=1,bit 2=0 if the section FEC and PEC are above a SD (Signal Degradation) threshold but below the SF threshold and the protection switching threshold is set to SF; and to bit 1=1 , bit 2=1 if the section FEC and PEC are above the SD threshold but below the SF threshold and the protection switching threshold is set to SD.

16. A method as claimed in claim 15 wherein, for a particular wayside tributary, WPSP (Wayside Protection Signal Failure) and WPSD (Wayside Protection Signal Degradation) bits are set at a DROP site according to the following conditions:

WPSF=1, if flag bits of the dropped wayside stream are:

{bit 2, bit 1}={0, 1}

0, if otherwise,

WPSD=1, if flag bits of the dropped wayside stream are:

{bit 2, bit 1}={1, 1}

0, if otherwise.

17. A method as claimed in claim 16, wherein a wayside protection switching process is triggered when WPSF or WPSD is set to 1.

18. In a SONET/SDH radio communication network comprising a plurality of main radio communication terminals and a plurality of repeaters intermediate the communication terminals, with wayside communication paths being established between pairs of said repeaters via two radio channels carrying the same data, a system for protection switching of said wayside paths, comprising, for each repeater, duplicated software and hardware on first and second service overhead access (SOA) units, said software determining if protection switching is required and signalling said hardware to effect protection switching, said switching being effected in a "break before make" manner as follows:

(1) the software enables ENABLE bits on a first SOA, which results in the hardware sending a signal to disable both ENABLE bits on the second SOA, (2) the output drivers of the second SOA are turned off based on the ENABLE bits control after which their status is fed back to the first SOA, (3) the output drivers of the first SOA are switched on based on its own ENABLE.

19. A system as claimed in claim 18, wherein said steps (1), (2) and (3) have a duration which is less than the duration of a wayside data bit.

20. A system as claimed in claim 18, wherein said hardware on each SOA unit includes means for receiving control signals and data bits from said software, an enable input and output for each of said two radio channels, a mate output status input and output, and two outputs indicating the status of each of its own two channels, said hardware also comprising a handshake unit including a state machine which receives the mate output status and said two outputs indicating the status of its own two channels and outputs for setting both enable inputs on the mate SOA and means for closing its own output drivers.

21. A method as claimed in claim 1, wherein the f bits for FEC and the p bits for PEC are 8 and 4 respectively.

22. A drop site repeater arranged to be implemented within a radio communication network comprising a plurality of main radio communication terminals and a plurality of repeaters intermediate the communication terminals, with at least one wayside communication path being established between an add site repeater and said drop site repeater via two radio channels carrying the same data, the drop site repeater determining whether to effect protection switching of a wayside path to the better of said two channels by operating to:

accumulate section FEC (Forward Error Correction) and PEC (Parity Error Count) by adding the main traffic's section FEC and PEC to the FEC bits and the PEC bits corresponding to the wayside stream to be dropped; and compare the FEC and PEC corresponding to the tributary to be dropped with predetermined thresholds to determine whether protection switching is required.

23. A drop site repeater as claimed in claim 22 further operating to set WPSF (Wayside Protection Signal Failure) and WPSD (Wayside Protection Signal Degradation) bits according to the following conditions:

WPSF=1, if the FEC and/or PEC recorded by FEC bits and PEC bits for the dropped wayside tributary are above a predetermined signal failure threshold;

=0, if both of them are below the predetermined signal failure threshold;

WPSD =1, if the FEC and/or PEC recorded by FEC bits and PEC bits for the dropped wayside tributary is above a predetermined signal degradation threshold;

=0, if both of them are below the predetermined signal degradation threshold; and wherein a wayside protection switching process is triggered when WPSF or WPSD is set to 1.

24. A drop site repeater arranged to be implemented within a radio communication network comprising a plurality of main radio communication terminals and a plurality of repeaters intermediate the communication terminals, with at least one wayside communication path being established between a pair of an add site repeater and said drop site repeater via two radio channels carrying the same data, said add site repeater setting 2 bits (bit 1, bit 2) of a wayside path signal flag byte to 0 to indicate FEC (Forward Error Correction) and PEC (Parity Error Count) quality for the wayside tributary, the drop site repeater determining whether to effect protection switching of a wayside path to the better of said two channels by operating to:

set the two bits for the wayside tributary to bit 1=0,bit 2=0 if the section FEC and PEC are below a switching threshold and the wayside path is normal;

set the two bits for the wayside tributary to bit 1=0,bit 2=1 if the section FEC and PEC are above a SF (Signal Failure) threshold;

set the two bits for the wayside tributary to bit 1=1, bit 2=0 if the section FEC and PEC are above a SD (Signal Degradation) threshold but below the SF threshold and the protection switching threshold is set to SF; and set the two bits for the wayside tributary to bit 1=1, bit 2=1 if the section FEC and PEC are above the SD threshold but below the SF threshold and the protection switching threshold is set to SD.

25. A drop site repeater as claimed in claim 24 further operating to set WPSP (Wayside Protection Signal Failure) and WPSD (Wayside Protection Signal Degradation) bits according to the following conditions:

WPSF=1, if flag bits of the dropped wayside stream are:

{bit 2, bit 1 }={0, 1}

0, if otherwise,

WPSD=1, if flag bits of the dropped wayside stream are:

{bit 2, bit 1}={1, 1}

0, if otherwise; and wherein the drop site repeater triggers a wayside protection switching process when WPSF or WPSD is set to 1.

* * * * *